(12) United States Patent
Akiyama

(10) Patent No.: US 7,052,140 B2
(45) Date of Patent: May 30, 2006

(54) ILLUMINATION DEVICE AND PROJECTOR EQUIPPED THEREWITH

(75) Inventor: Koichi Akiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 57 days.

(21) Appl. No.: 10/921,106

(22) Filed: Aug. 19, 2004

(65) Prior Publication Data

US 2005/0110956 A1 May 26, 2005

(30) Foreign Application Priority Data

Aug. 22, 2003 (JP) ............................. 2003-299077
Jun. 22, 2004 (JP) ............................. 2004-183653

(51) Int. Cl.
*G03B 21/14* (2006.01)

(52) U.S. Cl. .............................. 353/38; 353/20; 349/9; 362/331

(58) Field of Classification Search ................ 353/20, 353/31, 34, 37, 33, 38, 81; 349/5, 7, 8, 9; 359/495, 496, 497; 362/307, 308, 309, 326, 362/330, 331
See application file for complete search history.

(56) References Cited

U.S. PATENT DOCUMENTS

| | | | | |
|---|---|---|---|---|
| 6,257,726 | B1 * | 7/2001 | Okuyama | 353/20 |
| 6,416,182 | B1 * | 7/2002 | Kakuda et al. | 353/20 |
| 6,497,488 | B1 * | 12/2002 | Yamauchi et al. | 353/38 |
| 6,796,654 | B1 * | 9/2004 | Huang | 353/20 |
| 2001/0033418 | A1 * | 10/2001 | Hayashi | 359/487 |

FOREIGN PATENT DOCUMENTS

| | | |
|---|---|---|
| JP | A-07-181392 | 7/1995 |
| JP | A-09-120047 | 5/1997 |
| JP | A-09-146064 | 6/1997 |
| JP | A-11-160791 | 6/1999 |
| JP | A-2000-121997 | 4/2000 |
| JP | A-2000-206530 | 7/2000 |
| JP | A-2000-321535 | 11/2000 |
| JP | A-2001-066697 | 3/2001 |
| JP | A-2002-055208 | 2/2002 |
| JP | A-2002-090505 | 3/2002 |
| JP | A-2002-090884 | 3/2002 |
| JP | A-2002-221756 | 8/2002 |
| JP | A-2003-023585 | 1/2003 |
| JP | A-2003-075915 | 3/2003 |
| JP | A-2003-090981 | 3/2003 |
| JP | A-2003-149730 | 5/2003 |

\* cited by examiner

*Primary Examiner*—William C. Dowling
(74) *Attorney, Agent, or Firm*—Oliff & Berridge, PLC

(57) ABSTRACT

The illumination device in accordance with exemplary embodiments of the present invention is an illumination device including a light-emitting tube, an elliptical reflector, a parallelizing lens, a first lens array, a second lens array, and a polarized light conversion element. The polarized light conversion element includes a first polarized light separation unit having a single polarized light separation surface to conduct polarized light separation with respect to partial luminous fluxes of two rows, the first row and second row, of the second lens array and a single reflecting surface a second polarized light separation unit having a single polarized light separation surface to conduct polarized light separation with respect to partial luminous fluxes of two rows, the third row and fourth row, of the second lens array and a single reflecting surface, and a phase difference plate.

As a result, the illumination device and projector of reduced cost, increased light utilization efficiency, and extended service life can be provided.

22 Claims, 14 Drawing Sheets

_US 7,052,140 B2_

ILLUMINATION DEVICE AND PROJECTOR EQUIPPED THEREWITH

BACKGROUND OF THE INVENTION

1. Field of Invention

The present invention relates to an illumination device and a projector equipped therewith.

2. Description of Related Art

In the related art, a projector generally includes an illumination device to emit an illumination light, an electrooptical modulation device to modulate the illumination light from the illumination device according to the image signal, and a projecting optical system to project the light modulated by the electrooptical modulation device as a projected image on a projection surface such as a screen.

It may be preferred that the brightness distribution of the projected and displayed image in such a projector, be almost uniform. In the related art document JP-A-2002-55208 (FIGS. 1 to 3), an illumination device composed of the so-called integrator optical system capable of illuminating the illumination region where the image is to be formed with an almost uniform light intensity distribution, is used as the illumination device.

FIG. 13 shows a related art illumination device. FIGS. 14A–C illustrate the integrator optical system in a related art illumination device. FIG. 14(A) is a schematic perspective view of a first lens array and a second lens array. FIG. 14(B) is a schematic front view of the first lens array. FIG. 14(C) is a schematic showing an image formation region of a liquid-crystal unit serving as an electrooptical modulation device.

An illumination device 900, as shown in FIG. 13, includes a light source unit 910 and an integrator optical system 960.

The light source unit 910 includes a light-emitting tube 912, an elliptical reflector 914, and a parallelizing lens 916. The configuration is such that the light emitted from the light-emitting tube 912 is reflected by the elliptical reflector 914 and emitted toward the illuminated region. The light from the elliptical reflector 914 is converted into an almost parallel illumination luminous flux with the parallelizing lens 916.

The integrator optical system 960 includes a first lens array 920, a second lens array 930, a polarized light conversion element 940, and a superposition lens 950. The first lens array 920 is configured so that the illumination luminous flux from the light source unit 910 is split into a plurality of partial luminous fluxes and this plurality of partial luminous fluxes are superimposed on an image formation region LA of the liquid-crystal unit 970 with the second lens array 930 and the superposition lens 950. The longitudinal-lateral size ratio of the image formation region LA of the liquid-crystal unit 970 is set to a ratio of longitudinal size ($D_y$):lateral size ($D_x$)=3:4, as shown in FIG. 14(c).

With the illumination device 900, an illumination luminous flux having an almost uniform light intensity distribution can be realized on the image formation region LA of the liquid-crystal unit 970 even when the light intensity distribution of the illumination luminous flux emitted from the light source unit 910 is not uniform.

However, in such an illumination device, in order to increase the light utilization efficiency and reduce the level of stray light in the projector, it is preferred that the lens shape of the small lenses of the first lens array be similar to that of the image formation region of the liquid-crystal unit and that the first lens array have a square shape.

Accordingly, in the related art illumination device 900, as shown in FIG. 14, the first lens array 920 has a total of 48 small lenses 922 arranged in the form of a matrix comprising 8 rows and 6 columns in the longitudinal and lateral direction, respectively. Further, the longitudinal-lateral size ratio of the small lens 922 is set to a ratio of longitudinal size ($d_A$):lateral size ($d_B$)=3:4 and the first lens array has a square shape.

SUMMARY OF THE INVENTION

However, the following and/or other problems are associated with the related art illumination device 900. Since the small lenses 922 of the first lens array 920 were arranged in the form of a matrix comprising 8 rows and 6 columns in the longitudinal and lateral direction, respectively, the polarized light separation units to separate the partial luminous fluxes emitted from the second lens array 930 into polarized luminous fluxes of two types (P polarized luminous flux and S polarized luminous flux), had to be disposed in 6 columns in the lateral direction, as shown in FIG. 13. Therefore, the structure of the polarized light conversion element 940 was complex and the production cost of the polarized light conversion element 940 and, therefore, the illumination device 900, was difficult to reduce.

Furthermore, in the polarized light conversion element 940 in the related art illumination device 900, because the polarized light separation units were disposed in 6 columns in the lateral direction, the size of the polarized light separation units was difficult to increase. The resultant problem was that the light utilization efficiency decreased when the size of partial luminous fluxes emitted from the second lens array 930 could not be sufficiently small.

Further, when the size of partial luminous fluxes emitted from the second lens array 930 cannot be made sufficiently small, the quantity of light shielded by the light-shielding plate 944 increases. Therefore, the amount of heat absorbed in the light-shielding plate 944 also increases. The resultant problem was that the thermal effect produced by the light-shielding plate 944 in the polarized light conversion element 940 increased, and the product service life of the polarized light conversion element 940 and, therefore, the illumination device 900, could be easily shortened.

Exemplary embodiments of the present invention were created to resolve the above-described and/or other problems. Exemplary embodiments provide an illumination device that makes it possible to reduce the production cost, to increase the light utilization efficiency, and to extend the service life and a projector equipped therewith.

The illumination device in accordance with exemplary embodiments of the present invention include a light-emitting tube including a light-emitting portion to emit an illumination light, an elliptical reflector having respective focal points in the vicinity of the location of the light-emitting portion of the light-emitting tube. Further, in the illuminated region from the location of the light-emitting portion, a parallelizing lens to make the illumination luminous flux outgoing from the elliptical reflector, a first lens array in which small lenses of a flat rectangular shape, which split the illumination luminous flux parallelized with the parallelizing lens into a plurality of partial luminous fluxes, are arranged as a matrix composed of 6 rows and 4 columns in the longitudinal direction and lateral direction, respectively. Also included is a second lens array having a lateral width less than the lateral width of the first lens array and setting each partial luminous flux, which was split by the first lens array, parallel to the optical axis of the system, and a polarized light conversion element to convert each partial luminous flux outgoing from the second lens array into a partial luminous flux having a polarization axis in the prescribed direction.

The polarized light conversion element including a first polarized light separation unit including a single polarized light separation surface to transmit the partial luminous fluxes having polarization axes in one direction and reflecting the partial luminous fluxes having polarization axes in other directions with respect to partial luminous fluxes of two rows, the first row and second row, of the second lens array. A single reflecting surface is provided to further reflect the partial luminous fluxes having polarization axes in other directions that were reflected by the polarized light separation surface and to arrange them in the direction parallel to the partial luminous fluxes having polarization axes in the aforementioned one direction.

A second polarized light separation unit is included which has a configuration with a left-right symmetry with respect to the first polarized light separation unit and includes a single polarized light separation surface to transmit the partial luminous fluxes having polarization axes in one direction and reflecting the partial luminous fluxes having polarization axes in other directions with respect to partial luminous fluxes of two rows. The third row and fourth row, of the second lens array, and a single reflecting surface, reflect the partial luminous fluxes having polarization axes in other directions that were reflected by the polarized light separation surface and arrange them in the direction parallel to the partial luminous fluxes having polarization axes in the aforementioned one direction.

A phase difference plate is disposed in either the transmission region of the partial luminous fluxes having polarization axes in the aforementioned one direction or the transmission region of the partial luminous fluxes having polarization axes in the other direction.

Thus, in the illumination device in accordance with the exemplary embodiments of present invention, the arrangement number of small lenses of the first lens array is four columns in the lateral direction. The illumination device includes a polarized light conversion element including polarized light separation units. Both the first polarized light separation unit and the second polarized light separation unit having configuration with a left-right symmetry being composed of a single polarized light separation surface and a single reflecting surface. Therefore, the structure of the polarized light conversion element is simplified and the production cost of the polarized light conversion element and, therefore, the polarized light conversion element, can be easily reduced.

Further, with the illumination device in accordance with the present invention, it is not necessary to dispose the polarized light separation units in six columns in the lateral direction. Therefore, the size of the polarized light separation units can be somewhat increased. As a result, the decrease in light utilization efficiency can be reduced or prevented even when the size of partial luminous fluxes outgoing from the second lens array is not sufficiently small.

Further, with the illumination device in accordance with exemplary embodiments of the present invention, the polarized light conversion element does not need a light-shielding plate disposed in a region bridging the first polarized light separation unit and the second polarized light separation unit, as in the related art polarized light conversion element 940 shown in FIG. 13. Therefore, thermal effect from the light-shielding plate can be decreased and shortening of the service life of the polarized light conversion element and, therefore, the illumination device can be reduced or prevented.

Therefore, the illumination device in accordance with exemplary embodiments of the present invention makes it possible to reduce the production cost, to increase the light utilization efficiency, and to extend the service life.

It is preferred that in the illumination device in accordance with exemplary embodiments of the present invention, small lenses of the first lens array be disposed in matrix positions, except those corresponding to the first row—first column, first row—fourth column, sixth row—first column, and sixth row—fourth column of the matrix.

With such a configuration, the number of small lenses of the first lens array can be further reduced by four.

Further, it is preferred that in the illumination device in accordance with exemplary embodiments of the present invention, the longitudinal-lateral size ratio of the small lenses in the first lens array be set to a ratio of longitudinal size:lateral size=3:4.

With such a configuration, when an electrooptical modulation device is illuminated in which the longitudinal-lateral size ratio of the image formation region is set to a ratio of longitudinal size:lateral size=3:4, the light utilization efficiency can be increased and the level of stray light can be reduced.

Another illumination device in accordance with exemplary embodiments of the present invention includes a light-emitting tube including a light-emitting portion to emit an illumination light, an elliptical reflector having respective focal points in the vicinity of the location of the light-emitting portion of the light-emitting tube and further in the illuminated region from the location of the light-emitting portion, a parallelizing lens to make parallel the illumination luminous flux outgoing from the elliptical reflector, a first lens array in which small lenses of a flat rectangular shape, which split the illumination luminous flux parallelized with the parallelizing lens into a plurality of partial luminous fluxes, are arranged as a matrix composed of 7 rows and 4 columns in the longitudinal direction and lateral direction, respectively, a second lens array having a lateral width less than the lateral width of the first lens array and setting each partial luminous flux, which was split by the first lens array, parallel to the optical axis of the system, and a polarized light conversion element to convert each partial luminous flux outgoing from the second lens array into a partial luminous flux having a polarization axis in the prescribed direction.

The polarized light conversion element includes a first polarized light separation unit composed of a single polarized light separation surface to transmit the partial luminous fluxes having polarization axes in one direction and reflecting the partial luminous fluxes having polarization axes in other directions with respect to partial luminous fluxes of two rows, the first row and second row, of the second lens array and a single reflecting surface to further reflect the partial luminous fluxes having polarization axes in other directions that were reflected by the polarized light separation surface and to arrange them in the direction parallel to the partial luminous fluxes having polarization axes in the aforementioned one direction.

A second polarized light separation unit is included which has a configuration with a left-right symmetry with respect to the first polarized light separation unit and is composed of a single polarized light separation surface to transmit the partial luminous fluxes having polarization axes in one direction and to reflect the partial luminous fluxes having polarization axes in other directions with respect to partial luminous fluxes of two rows, the third row and fourth row, of the second lens array and a single reflecting surface to further reflect the partial luminous fluxes having polarization axes in other directions that were reflected by the polarized light separation surface and to arrange them in the direction parallel to the partial luminous fluxes having polarization axes in the aforementioned one direction.

A phase difference plate is disposed in either the transmission region of the partial luminous fluxes having polarization axes in the aforementioned one direction or the transmission region of the partial luminous fluxes having polarization axes in the other direction.

Therefore, the other illumination device in accordance with exemplary embodiments of the present invention, similarly to the above-described illumination device in accordance with embodiments of the present invention, makes it possible to reduce the production cost, to increase the light utilization efficiency, and to extend the service life. It is preferred that in the other illumination device in accordance with exemplary embodiments of the present invention small lenses of the first lens array are disposed in matrix positions, except those corresponding to the first row—first column, first row—fourth column, seventh row—first column, and seventh row—fourth column of the matrix.

With such a configuration, the number of small lenses of the first lens array can be further reduced by four.

Further, it is preferred that in the other illumination device in accordance with exemplary embodiments of the present invention, the longitudinal-lateral size ratio of the small lenses in the first lens array be set to a ratio of longitudinal size:lateral size=9:16.

With such a configuration, when an electrooptical modulation device is illuminated in which the longitudinal-lateral size ratio of the image formation region is set to a ratio of longitudinal size:lateral size=9:16, the light utilization efficiency can be increased and the level of stray light can be reduced.

Further, it is preferred that in the illumination device in accordance with the exemplary embodiments of present invention or in the other illumination device in accordance with exemplary embodiments of the present invention, the phase difference plate be a single phase difference plate disposed in a continuous fashion in the transmission region of the partial luminous flux having a polarization axis in the aforementioned one direction.

With such a configuration, the operation of mounting the phase difference plate on the polarized light separation unit can be facilitated and the operation of assembling the polarized light conversion element can be simplified.

Further, it is preferred that in the illumination device in accordance with exemplary embodiments of the present invention or in the other illumination device in accordance with exemplary embodiments of the present invention, the polarized light conversion element be composed of a polarized light conversion element with a trapezoidal lateral cross section, and the reflecting surfaces be disposed in positions corresponding to both sides of the trapezoid of the polarized light conversion element.

With such a configuration, the polarized light conversion element can be miniaturized, the structure thereof can be further simplified, and the production cost can be reduced.

Further, it is preferred that in the illumination device in accordance with exemplary embodiments of the present invention or in the other illumination device in accordance with exemplary embodiments of the present invention, the maximum lateral size of the second lens array be set to a size which is about half the maximum lateral size of the first lens array.

With such a configuration, the size of the second lens array can be reduced. Therefore, the second lens array can be miniaturized and the production cost thereof can be reduced.

Further, it is preferred that in the illumination device in accordance with exemplary embodiments of the present invention or in the other illumination device in accordance with exemplary embodiments of the present invention the lateral size of the light incidence surface of the polarized light conversion element be set to a size almost equal to the maximum lateral size of the second lens array.

With such a configuration, the partial luminous fluxes from the second lens array can be caused to fall on the light incidence surface of the polarized light conversion element with good efficiency and the light utilization ratio in the illumination device can be increased.

Further, it is preferred that in the illumination device in accordance with exemplary embodiments of the present invention or in the other illumination device in accordance with exemplary embodiments of the present invention, the light-emitting tube be provided with a reflecting device to reflect the light emitted from the light-emitting tube to the illuminated region toward the elliptical reflector.

With such a configuration, the light emitted from the light-emitting tube toward the illuminated region is reflected toward the elliptical reflector. Therefore, it is not necessary to set the size of the elliptical reflector so as to cover the end portions of the light-emitting tube on the side of the illuminated region and the elliptical reflector can be miniaturized. As a result, the illumination device can be miniaturized.

Further, miniaturizing the elliptical reflector makes it possible to decrease the beam spot and convergence angle of the beam converged from the elliptical reflector toward the second focal point of the elliptical reflector. Therefore, optical elements of the last stage, starting from the parallelizing lens, can be reduced in size and the illumination device can be further miniaturized. The projector in accordance with exemplary embodiments of the present invention includes the illumination device in accordance with exemplary embodiments the present invention or the other illumination device in accordance with the present invention, an electrooptical modulation device to modulate the illumination light from the illumination device or the other illumination device according to the image information, and a projecting optical system to project the modulated light from the electrooptical modulation device.

Therefore, because the projector in accordance with exemplary embodiments of the present invention includes an excellent illumination device which, as described hereinabove, makes it possible to reduce the production cost, to increase the light utilization efficiency, and to extend the service life, the projector has a low cost, a high brightness and a long service life.

DETAILED DESCRIPTION OF PREFERRED EMBODIMENTS

An illumination device in accordance with exemplary embodiments of the present invention and a projector equipped therewith, will be explained hereinbelow based on the exemplary embodiments illustrated by the appended figures.

Exemplary Embodiment 1

Figure 1:
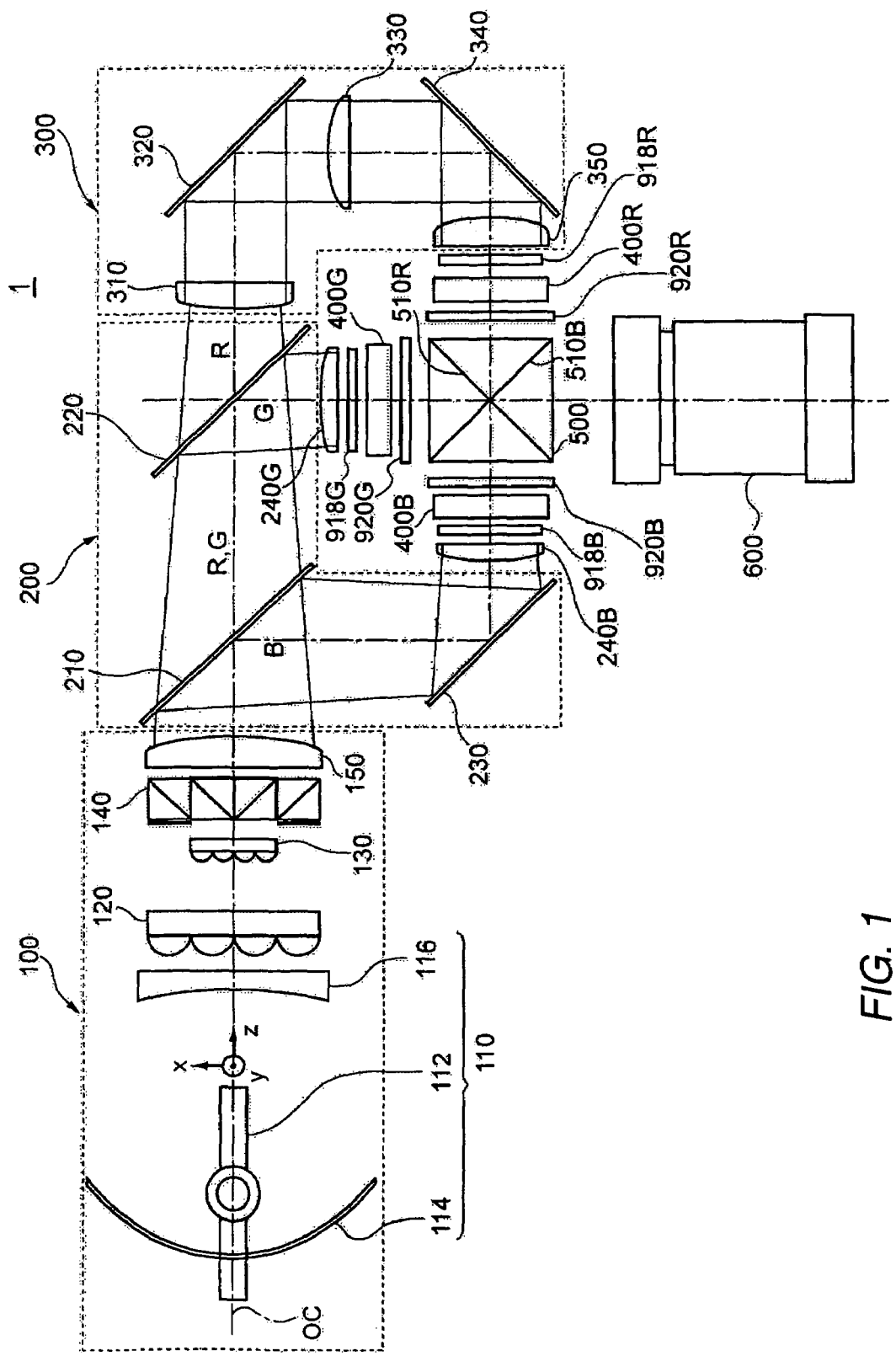
FIG. 1 is a schematic showing the optical system of the projector of Exemplary Embodiment 1.

FIG. 1 illustrates the optical system of the projector of Exemplary Embodiment 1. Further, in the explanation below, the three mutually orthogonal directions will be set as a z direction (direction parallel to the optical axis of the system), a x direction (direction perpendicular to the z direction and parallel to the sheet plane), and an y direction (direction perpendicular to the sheet plane).

A projector 1 of Exemplary Embodiment 1, as shown in FIG. 1, includes an illumination device 100, a color separation optical system 200, a relay optical system 300, three liquid-crystal units 400R, 400G, and 400B, a cross dichroic prism 500, and a projection optical system 600. The structural elements of each optical system are disposed in an almost horizontal direction around the cross dichroic prism 500.

The illumination device 100 includes a light source unit 110, a first lens array 120, a second lens array 130, a polarized light conversion element 140, and a superposition lens 150. The illumination luminous flux emitted from the light source unit 110 is separated into a plurality of partial luminous fluxes by the first lens array 120, and each partial luminous flux is superimposed on image formation regions of three liquid-crystal units 440R, 400G, and 400B, which are the illumination objects, by the second lens array 130 and superposition lens 150.

The illumination device 100 will be described below in greater detail.

The color separation optical system 200 has a function of separating the illumination luminous flux emitted from the illumination device 100 into three color illumination luminous fluxes with mutually different wavelength regions. The first dichroic mirror 210 reflects a luminous flux of an almost blue color (referred to hereinbelow as "B light") and transmits a luminous flux of an almost green color (referred to hereinbelow as "G light") and a luminous flux of an almost red color (referred to hereinbelow as "R light"). The B light reflected by the first dichroic mirror 210 is further reflected by a reflective mirror 230, passes a field lens 240B and falls on the liquid-crystal unit 400B for the B light.

The field lens 240B converges the light so that a plurality of partial luminous fluxes from the illumination device 100 illuminate the liquid-crystal unit 400B for the B light. Usually, the partial luminous fluxes are so set as to become almost parallel luminous fluxes. Field lenses 240G, 350 installed in front of other liquid-crystal units 400G, 400R are composed similarly to the field lens 240B.

Of the G light and R light that passed through the first dichroic mirror 210, the G light is reflected by the second dichroic mirror 220, passes through the field lens 240G and illuminates the liquid-crystal unit 400G for the G light. On the other hand, the R light is transmitted through the second dichroic mirror 220, passes through the relay optical system 300, and illuminates the liquid-crystal unit 400R for the R light.

The relay optical system 300 includes an incoming-side lens 310, an incoming-side reflective mirror 320, a relay lens 330, an outgoing-side reflective mirror 340, and a field lens 350. The R light emitted from the color separation optically system 200 is converged by the incoming-side lens 310 in the vicinity of the relay lens 330 and diverges toward the outgoing-side reflective mirror 340 and field lens 350. The amount of the luminous flux falling on the field lens 350 is set to become almost equal to the amount of the luminous flux falling on the incoming-side lens 310.

The liquid-crystal units 400R, 400G, 400B for each color light convert the color lights falling on respective light incidence surfaces into lights associated with respective corresponding image signals and the converted lights are emitted as transmitted lights. On the incidence side of the liquid-crystal units 400R, 400G, 400B, there are disposed respective incoming-side polarizing plates 918R, 918G, 918B. On the outgoing side, there are disposed respective outgoing-side polarizing plates 920R, 920G, 920B. Transmission-type liquid-crystal units having a longitudinal-lateral size ratio of the image formation region of longitudinal size:lateral size=3:4 are used as the liquid-crystal units 400R, 400G, 400B.

The cross dichroic prism 500 has a function of a color synthesis optical system to synthesize converted lights of each color outgoing from the liquid-crystal units 400R, 400G, 400B for each color light. Further, prism 500 has an R light reflection dichroic surface 510R to reflect the R light and a B light reflection dichroic surface 510B to reflect the B light. The R light reflection dichroic surface 510R and B light reflection dichroic surface 510B are provided by forming a dielectric multilayer film to reflect the R light and a dielectric multilayer film to reflect the B light in an almost X-like fashion on interfaces of four rectangular prisms. The converted lights of three colors are synthesized by those two reflecting dichroic surfaces 510R, 510B, and a light to display a color image is produced. The synthesized light produced in the cross dichroic prism 500 is emitted toward the projection optical system 600.

The projection optical system 600 is composed so that the synthesized light from the cross dichroic prism 500 is projected as a displayed image on the projection surface such as a screen.

Figure 2:
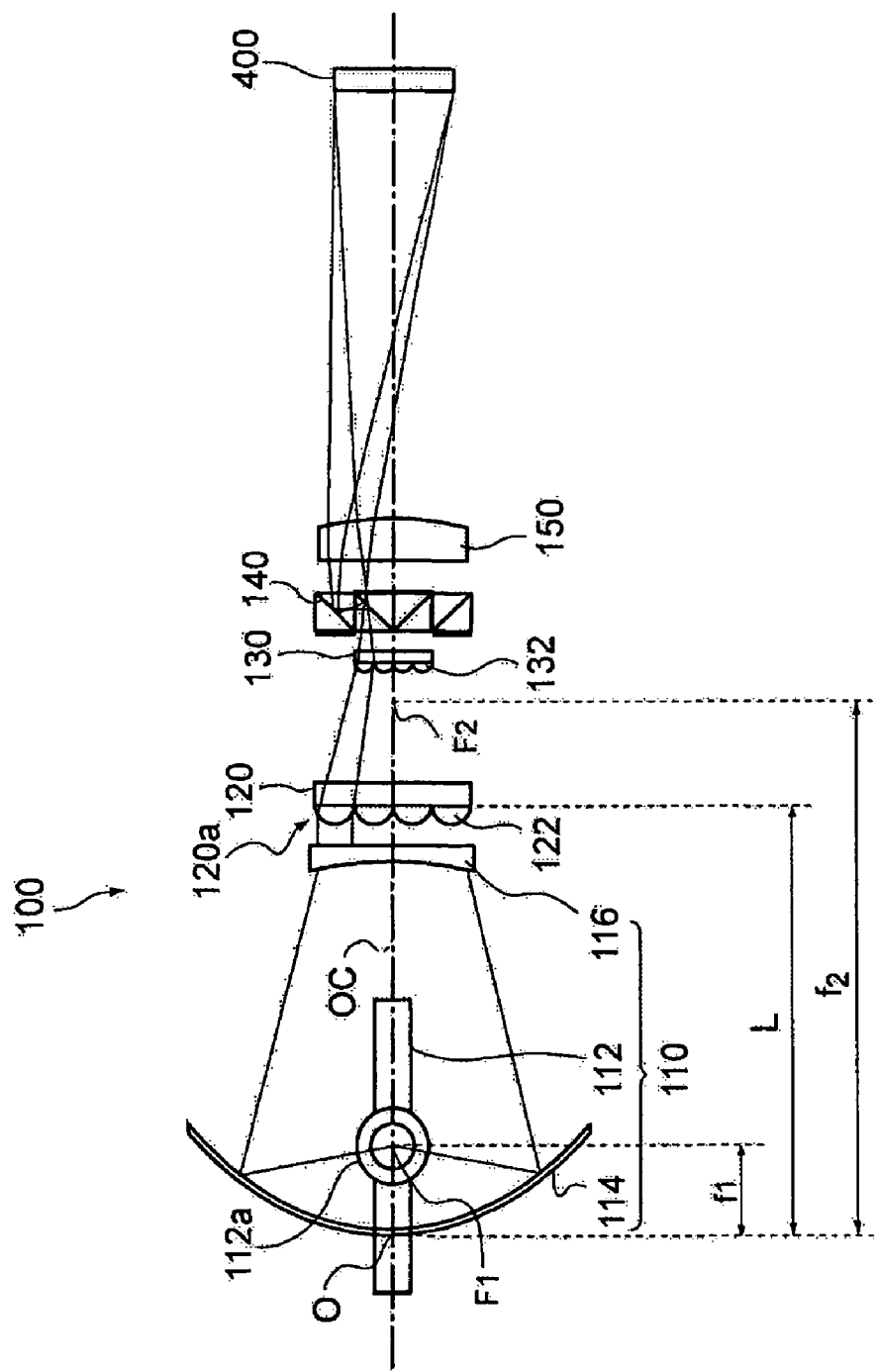
FIG. 2 is a schematic showing the illumination device of Exemplary Embodiment 1.
Figure 3A:
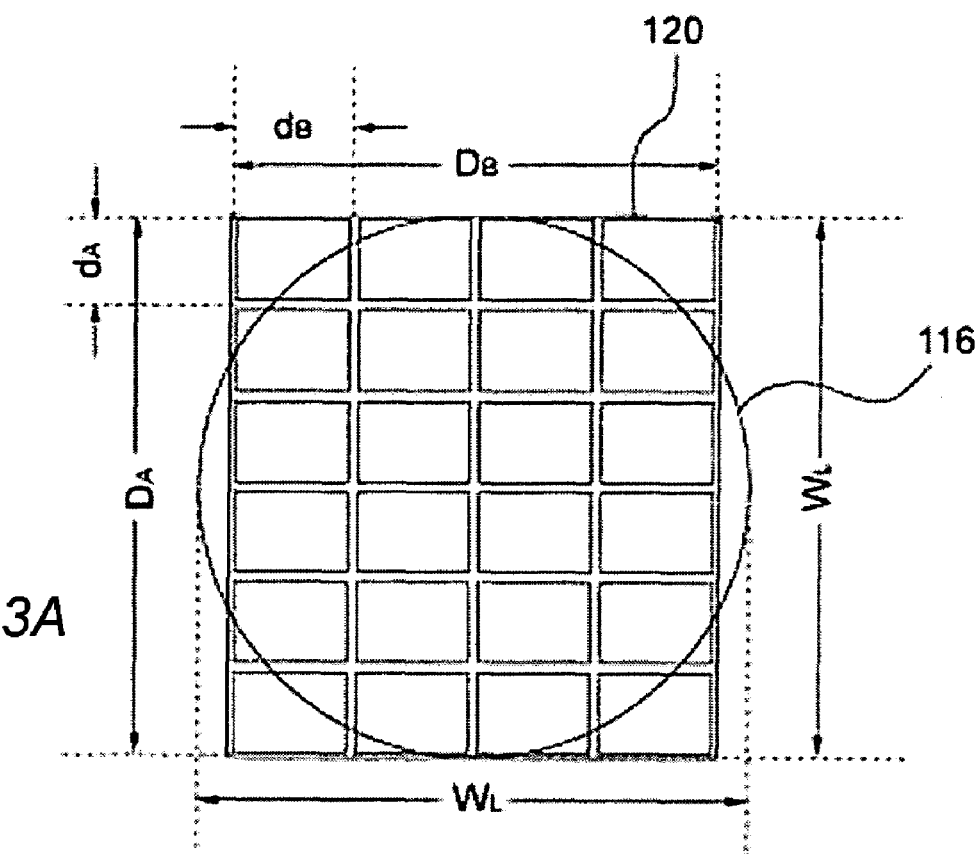
FIGS. 3A–B are schematics showing the first lens array of Exemplary Embodiment 1.
Figure 3B:
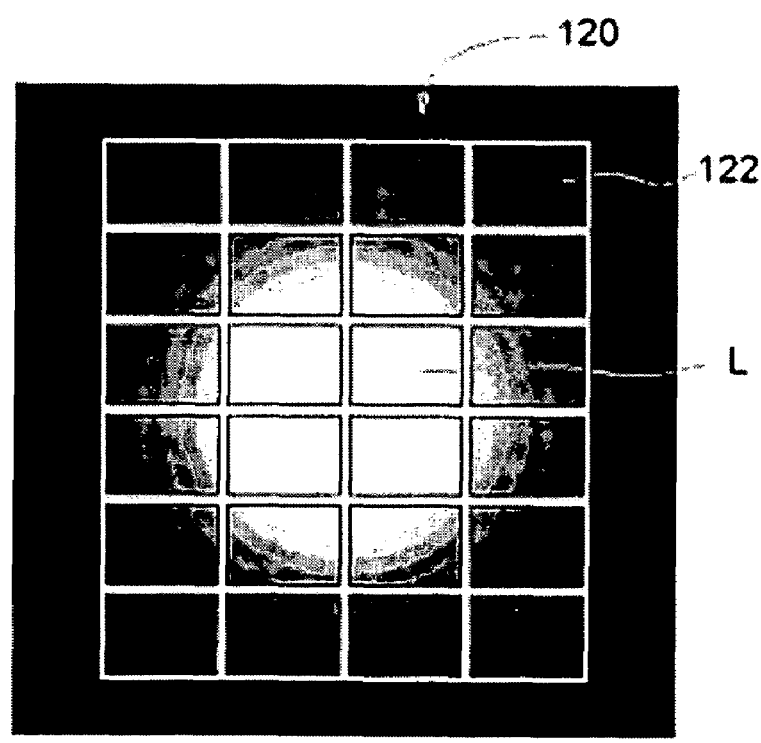
Figure 4A:
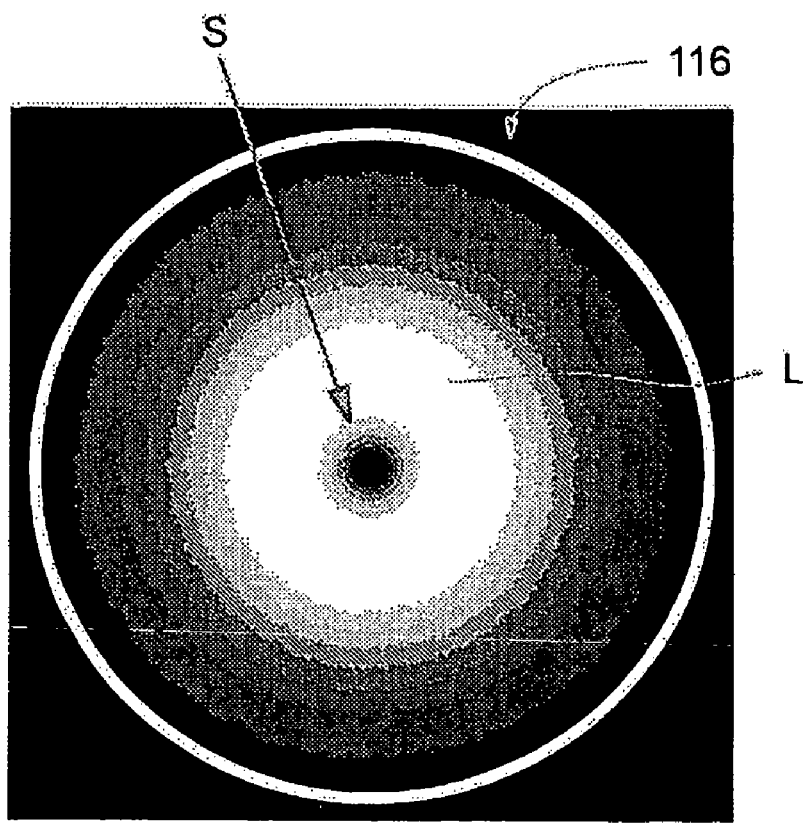
FIGS. 4A–B are schematics showing the first lens array of Exemplary Embodiment 1.
Figure 4B:
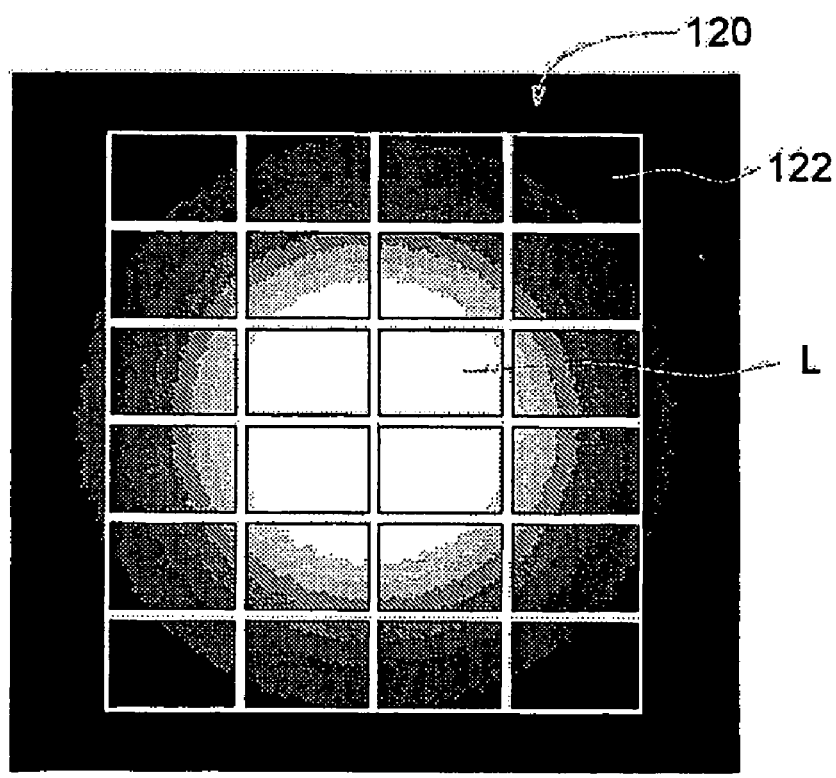
Figure 5:
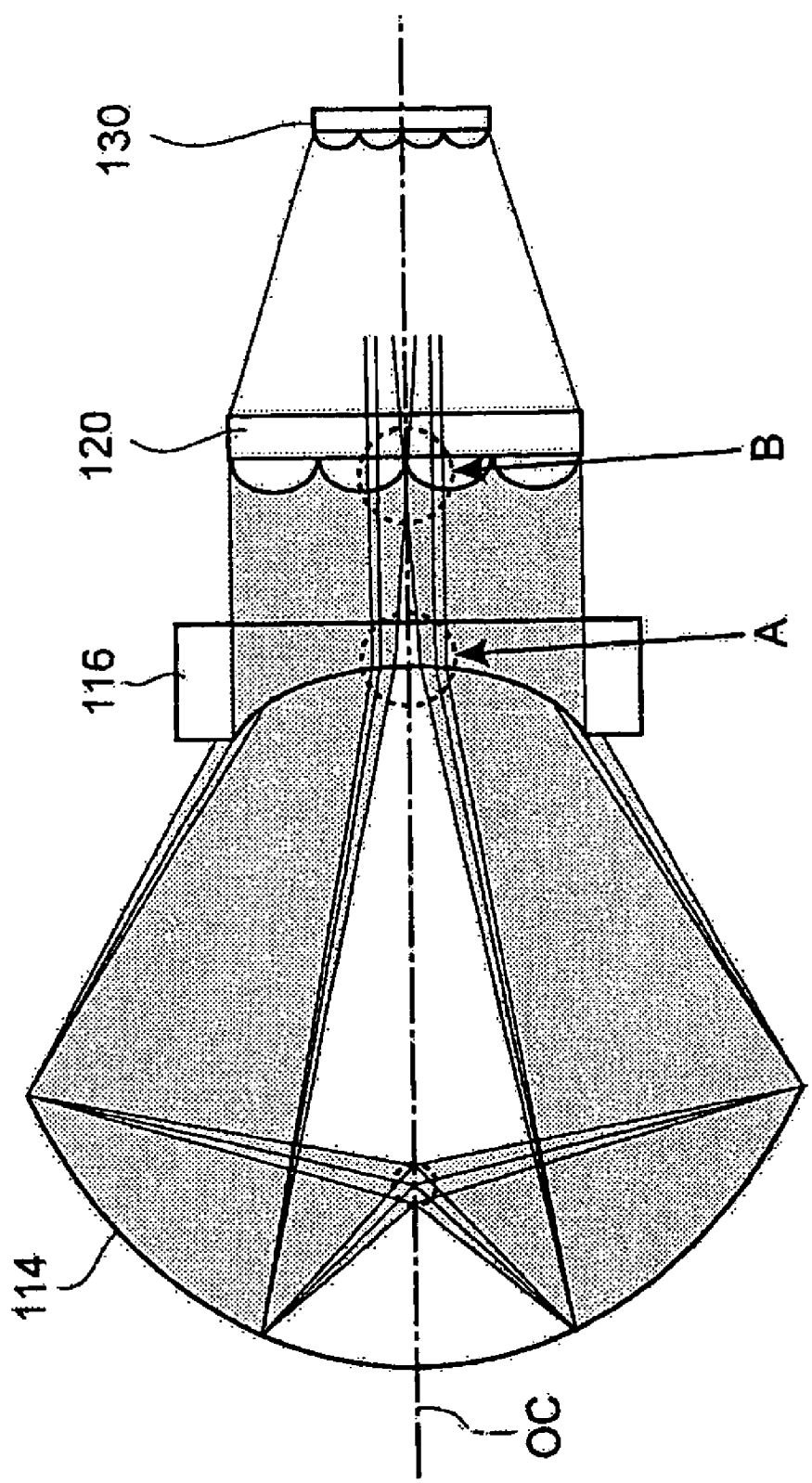
FIG. 5 is a schematic showing the main part of the illumination device and the path of luminous flux in Exemplary Embodiment 1.
Figure 6A:
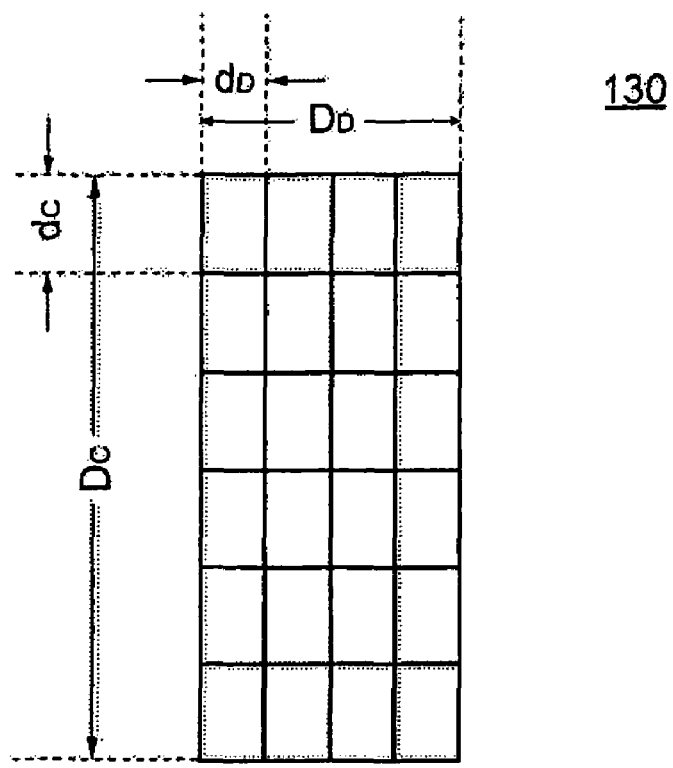
FIGS. 6A–B are schematics showing the second lens array of Exemplary Embodiment 1.
Figure 6B:
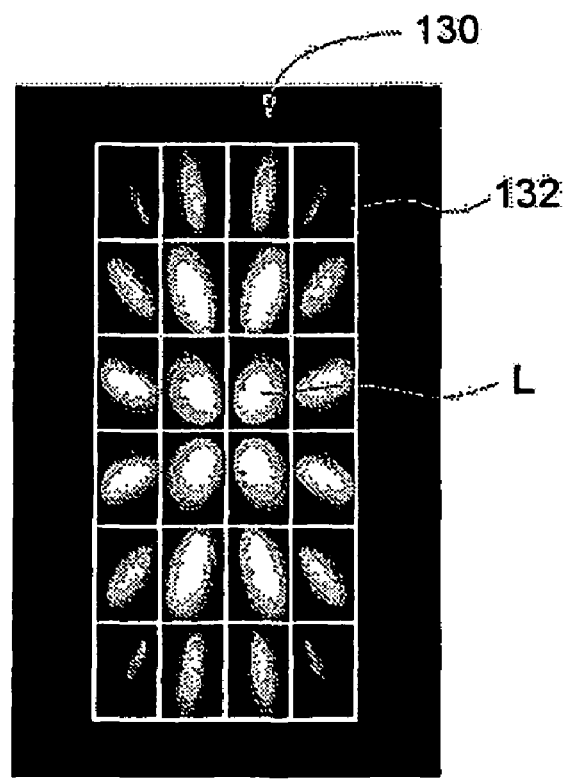
Figure 7:
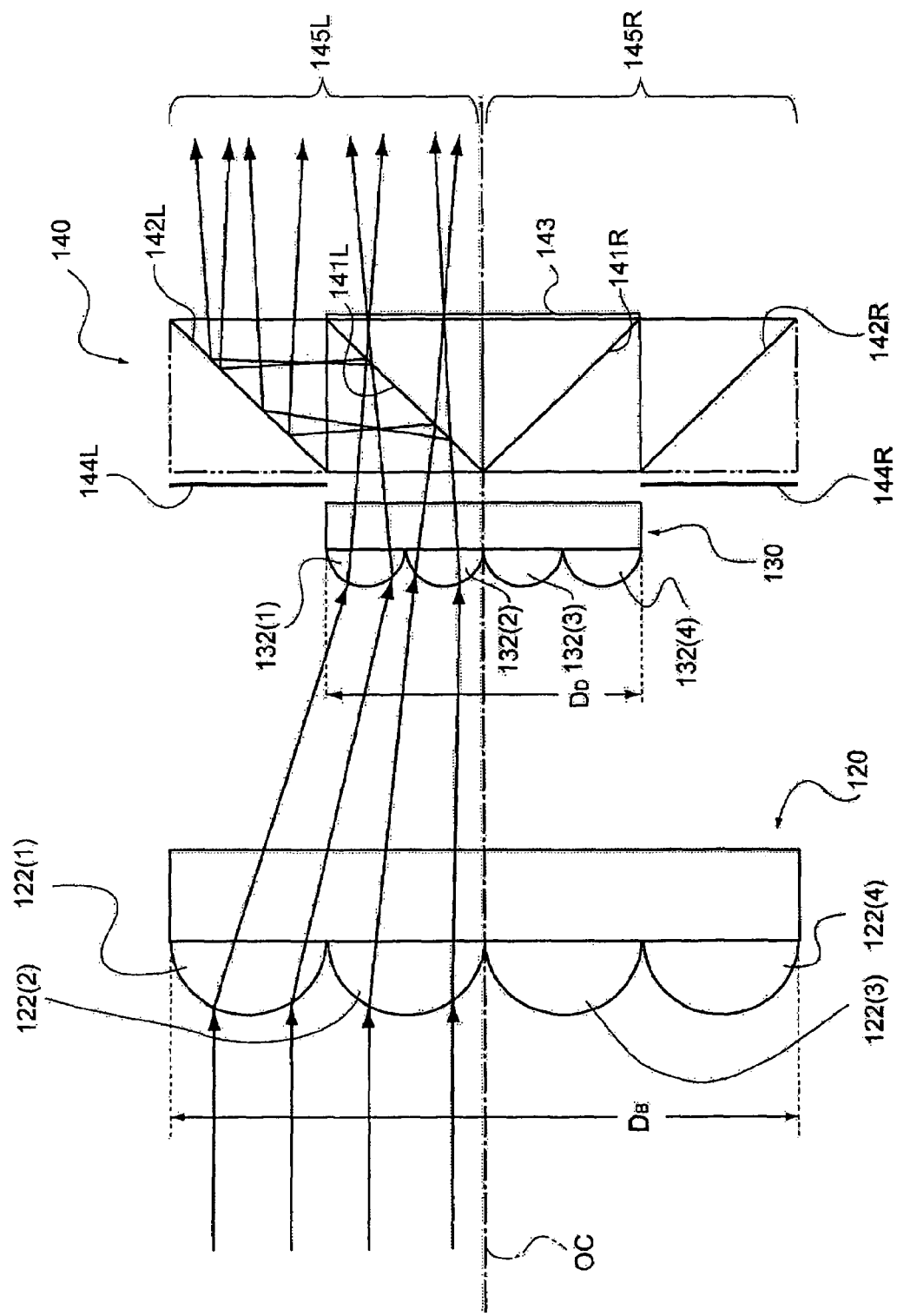
FIG. 7 is a schematic showing the polarized light conversion element of Exemplary Embodiment 1.

The illumination device of Exemplary Embodiment 1 will be described below in greater detail by using FIGS. 2 to 7. FIG. 2 is a figure for explaining the illumination device of Exemplary Embodiment 1. FIG. 3 is a figure for explaining the first lens array in Exemplary Embodiment 1. FIG. 3(A) is a schematic view from the front surface of the first lens array along the optical axis of the system. FIG. 3(B) is a schematic showing the light intensity distribution in the light incidence plane of the first lens array. FIG. 4 is a schematic showing the first lens array in Exemplary Embodiment 1. FIG. 4(A) is a schematic showing the light intensity distribution in the light incidence plane of a parallelizing lens. FIG. 4(B) is a schematic showing the light intensity distribution in the light incidence plane of the first lens array. FIG. 5 is a schematic showing a trajectory of luminous flux in the main parts of the illumination device of Exemplary Embodiment 1. The luminous flux portions are shown by gray color. FIGS. 6A–B are schematics showing the second lens array in Exemplary Embodiment 1. FIG. 6(B) is a schematic showing the front surface of the second lens array along the system optical lens. FIG. 6(B) is a schematic showing the light intensity distribution in the light incidence plane of the second lens array. FIG. 7 is a schematic showing the polarized light conversion element in Exemplary Embodiment 1.

The illumination device 100 of Exemplary Embodiment 1, as shown in FIG. 2, includes a light source unit 110, a first lens array 120, a second lens array 130, a polarized light conversion element 140, and a superposition lens 150.

The light source unit 110 includes a light-emitting tube 112, an elliptical reflector 114, and a parallelizing lens 116.

The light-emitting tube 112 is composed, for example, of quartz glass and includes a light-emitting portion 112a and a sealing portion connected to both side portions of the light-emitting portion 112a. The light-emitting portion 112a is a hollow portion filled with mercury, a rare gas, and a halogen. Further, the light-emitting portion 112a is disposed close to a focal point $F_1$ of the two focal points $F_1$, $F_2$ of the elliptical reflector 114.

For example, a high-pressure mercury lamp can be used as the light-emitting tube 112. Other lamps such as metal halide lamps or xenon lamps can be also used.

The elliptical reflector 114 has an opening on the illuminated region side thereof and is disposed behind the light-emitting portion 112a of the light-emitting tube 112. Further, it has two focal points $F_1$, $F_2$ disposed with the prescribed spacing on the optical axis OC of the system. The two focal points $F_1$, $F_2$ are disposed in positions at respective optical distances $f_1=12$ mm and $f_{2=60}$ mm from a virtual point O where the virtual elliptical surface connected to the elliptical surface of the elliptical reflector 114 is intersected by the optical axis OC of the system.

The parallelizing lens 116 is a concave lens disposed on the illuminated region side of the elliptical reflector 114. Further, it is so constructed as to obtain an almost parallel light from the elliptical reflector 114. The effective diameter of the parallelizing lens 116 is set to a size almost equal to a longitudinal size of the first lens array 120, as shown in FIG. 3(a).

The first lens array 120, as shown in FIGS. 2 to 5, has a plurality of small lenses 122 and is installed on the illuminated region side of the parallelizing lens 116. It is so constructed as to split the illumination luminous flux that was made almost parallel by the parallelizing lens 116 into a plurality of partial luminous fluxes. Further, it is also constructed so that the light incidence region 120a is positioned on the elliptical reflector side (position an optical distance L=48 mm from virtual point O) from the focal point $F_2$ of the elliptical reflector 114. As a result, the quantity of light of the luminous flux L outgoing from the parallelizing lens 116 is distributed, as shown in FIG. 3(b), over the entire light incidence region 120a (see FIG. 2) of the first array 120, that is, the shadow of the light-emitting tube 112 is reduced.

Further, in the illumination device 100 of Embodiment 1, the parallelizing lens 116 is disposed in a position A on the optical axis OC of the system such that a region S (shadow region) with an extremely small incidence light intensity is present in the central portion of the light incidence surface, as shown in FIG. 4(a) and FIG. 5. By contrast, the first lens array 120 is disposed in a position B on the optical axis OC of the system such that a region S (shadow region) with an extremely small incidence light intensity is not present in the central portion of the light incidence surface, as shown in FIG. 4(b) and FIG. 5, that is, disposed in a position at an optical distance L=48 mm from the virtual point O (see FIG. 2).

In the illumination device 100 of Exemplary Embodiment 1, small lenses 122 of the first lens array 120 are arranged in the form of a matrix consisting of 6 rows and 4 columns in the longitudinal and lateral direction in a plane crossing the optical axis OC of the system and are disposed in positions corresponding to each row and each column of this matrix. As a result, a total number of the small lenses 122 of the first lens array 120 can be 24 and the number of lenses can be reduced. Therefore, the process for producing the first lens array can be simplified and the production cost can be reduced.

In the illumination device 100 of Exemplary Embodiment 1, the longitudinal-lateral size ratio of the small lenses 122 of the first lens array 120 is set at longitudinal size ($d_A$): lateral size ($d_B$)=3:4. As a result, in case of illuminating a liquid-crystal unit in which the longitudinal-lateral size ratio of the image formation region is set to 3:4, the light utilization efficiency can be increased and a stray light level can be reduced.

In the illumination device 100 of Exemplary Embodiment 1, the effective diameter $W_L$ of the parallelizing lens 116 is set, as shown in FIG. 3(a) to a size almost equal to the maximum longitudinal size $D_A$ of the first lens array 120. As a result, the uniformity of the in-plane light intensity distribution on the light incidence surface of the first lens array can be enhanced or improved.

A second lens array 130, as shown in FIG. 2, has a plurality of small lenses 132 corresponding to the small lenses 122 of the first lens array 120 and are disposed on the illuminated region side of the first lens array 120. Further, array 130 is constructed so that the partial luminous fluxes split by the first lens array 120 become the partial luminous fluxes parallel to the optical axis OC of the system. Moreover, together with the superposition lens 150, the second lens array superimposes those partial light fluxes on the image formation region of the liquid-crystal units 400R, 400G, 400B.

As shown in FIG. 7, in the illumination device 100 of Exemplary Embodiment 1, the maximum lateral size $D_D$ of the second lens array 130 is set to a size almost half the maximum lateral size $D_B$ of the first lens array 120. As a result, the size of the second lens array 130 can be decreased. Therefore, the size of the second lens array can be decreased and the production cost can be reduced.

Similarly to the small lenses 122 of the first lens array 120, the small lenses 132 of the second lens array 130 are arranged in the form of a matrix composed of 6 rows and 4 columns in the longitudinal direction and lateral direction in the plane perpendicular to the optical axis OC of the system and are disposed in the positions corresponding to each row and each column of the matrix. As a result, the total number of the small lenses 132 of the second lens array 130 can be 24 and the number of lenses can be reduced. Therefore, the process for producing the second lens array can be simplified and the production cost can be reduced.

Further, a configuration may be also used in which the small lenses 122 of the first lens array 120 are arranged in the form of a matrix composed of 6 rows and 4 columns in the longitudinal direction and lateral direction in the plane perpendicular to the optical axis OC of the system and are disposed in matrix positions, except those corresponding to the first row—first column, first row—fourth column, sixth row—first column, and sixth row—fourth column of the matrix. In this case, of the small lenses 122 of the above-described first lens array 120, the number of lenses can be further decreased by four.

Further, a configuration may be also used in which the small lenses 132 of the second lens array 130 are disposed in matrix positions corresponding to the arrangement of the small lenses 122 of the first lens array 120, except those corresponding to the first row—first column, first row—fourth column, sixth row—first column, and sixth row—fourth column of the matrix. In this case, of the small lenses 132 of the above-described second lens array 130, the number of lenses can be further decreased by four.

As shown in FIG. 7, the polarized light conversion element 140 includes a first polarized light separation unit 145L and a second polarized light separation unit 145R which sandwich the optical axis OC and have a left-right symmetrical configuration and a phase difference plate 143.

The first polarized light separation unit 145L includes a single polarized light separation surface 141L to transmit the partial luminous fluxes having polarization axes in one direction and reflecting the partial luminous fluxes having polarization axes in other directions with respect to partial luminous fluxes of two rows of small lenses 132(1) of the first row and small lenses 132(2) of the second row of the second lens array 310 and a single reflecting surface 142L to further reflect the partial luminous fluxes having polarization axes in other directions that were reflected by the polarized light separation surface 141L and arranging them in the direction parallel to the partial luminous fluxes having polarization axes in the aforementioned one direction.

The second polarized light separation unit 145R includes a single polarized light separation surface 141R to transmit the partial luminous fluxes having polarization axes in one direction and reflecting the partial luminous fluxes having polarization axes in other directions with respect to partial luminous fluxes of two rows: of small lenses 132(3) of the third row and small lenses 132(4) of the fourth row of the second lens array 130 and a single reflecting surface 142R to further reflect the partial luminous fluxes having polarization axes in other directions that were reflected by the polarized light separation surface 141R and arranging them in the direction parallel to the partial luminous fluxes having polarization axes in the aforementioned one direction.

The phase difference plate 143 is disposed in the transmission region of the partial luminous fluxes having polarization axes in one direction in the light outgoing surface of the first polarized light separation unit 145L and the second polarized light separation unit 145R. As a result, the partial luminous flux outgoing from the polarized light conversion element 140 can be obtained as a partial luminous flux having a polarization axis in the other direction. Therefore, it can be advantageously used in a projector employing a liquid-crystal unit using a polarized light.

In the illumination device 100 of Exemplary Embodiment 1, the phase difference plate 143 is a single phase difference plate disposed in a continuous fashion in the transmission region of the partial luminous fluxes having polarization axes in one direction. As a result, the operation of mounting the phase difference plate 143 with respect to the first polarized light separation unit 145L and second polarized light separation unit 145R can be simplified and the operation of assembling the polarized light conversion unit can be also simplified.

As shown in FIG. 7, light-shielding plates 144L, 144R are formed in the vicinity of the light incidence plane of the polarized light conversion element 140. As a result, the undesirable light that falls on the polarized light conversion element 140 can be shielded by the light-shielding plates 144L, 144R. Therefore, the deterioration of optical performance of the polarized light conversion element caused by the incidence of the undesirable light can be inhibited.

In the illumination device 100 of Exemplary Embodiment 1, the polarized light conversion element 140 includes a polarized light conversion element of a trapezoidal cross-sectional shape, and the above-mentioned reflecting surfaces 142L, 142R are arranged at the positions corresponding to the sides of the trapezoid of the polarized light conversion element 140, as shown in FIG. 7. As a result, the polarized light conversion element can be miniaturized and its structure can be further simplified, whereby the production cost can be reduced.

In the illumination device 100 of Exemplary Embodiment 1, the lateral size of the light incidence plane of the polarized light conversion element 140 is set to be almost equal to the maximum lateral size, $D_D$, of the second lens array 120, as shown in FIG. 7. As a result, each partial luminous flux from the second lens array 130 can be caused to fall with good efficiency on the light incidence plane of the polarized light conversion element 140 and the light utilization efficiency in the illumination device can be increased.

The superposition lens 150 includes a conversion lens and is disposed on the illuminated region side of the polarized light conversion element 140. Further, this lens is configured to converge the luminous fluxes emitted from the polarized light conversion element 140 and to superimpose them on the second lens array 130 and also the image formation regions of the liquid-crystal units 400R, 400G, 400B.

With the illumination device 100 of the above-described Exemplary Embodiment 1, the number of columns of small lenses 122 of the first array 120 in the lateral direction is four, and the device includes the polarized light conversion element 140 having polarized light separation units. Accordingly, both the first polarized light separation unit 145L and the second polarized light separation unit 145R having a left-right symmetrical configuration, are composed of a single polarized light separation surface and a single reflecting surface. Therefore, the structure of the polarized light conversion element is simplified and the production cost of the polarized light conversion element and, therefore, the illumination device, can be easily reduced.

Further, with the illumination device 100 of Exemplary Embodiment 1, it is not necessary to arrange the polarized light separation units in 6 columns in the lateral direction, as in the related art structure. Therefore, the size of the polarized light separation units can be somewhat increased. As a result, even if the size of each partial luminous flux emitted from the second lens array cannot be sufficiently decreased, the decrease in light utilization efficiency can be reduced or prevented.

Further, with the illumination device 100 of Exemplary Embodiment 1, the polarized light conversion element 140 makes it unnecessary to employ a light-shielding plate disposed in the region bridging the first polarized light separation unit 145L and the second polarized light separation unit 145R, as in the related art polarized light conversion element 940. Therefore, thermal effect from the light-shielding plate can be reduced and shortening of the service life of the polarized light conversion element and, therefore, the illumination device can be suppressed.

As a result, the illumination device 100 of Exemplary Embodiment 1 allows for the reduction in the production cost, increase in light utilization efficiency, and extension of service life.

The projector 1 of Exemplary Embodiment 1 includes the above-described illumination device 100, liquid-crystal units 400R, 400G, 400B to modulate the illumination light from the illumination device 100 according to image information, and the projection optical system 600 to project the polarized light from the liquid-crystal units 400R, 400G, 400B.

Therefore, the projector of Exemplary Embodiment 1, as described hereinabove, allows for the reduction in the production cost, increase in light utilization efficiency, and extension of service life. Because the projector is equipped with excellent illumination device 100, it has a low cost, a high brightness and a long service life.

Figure 8A:
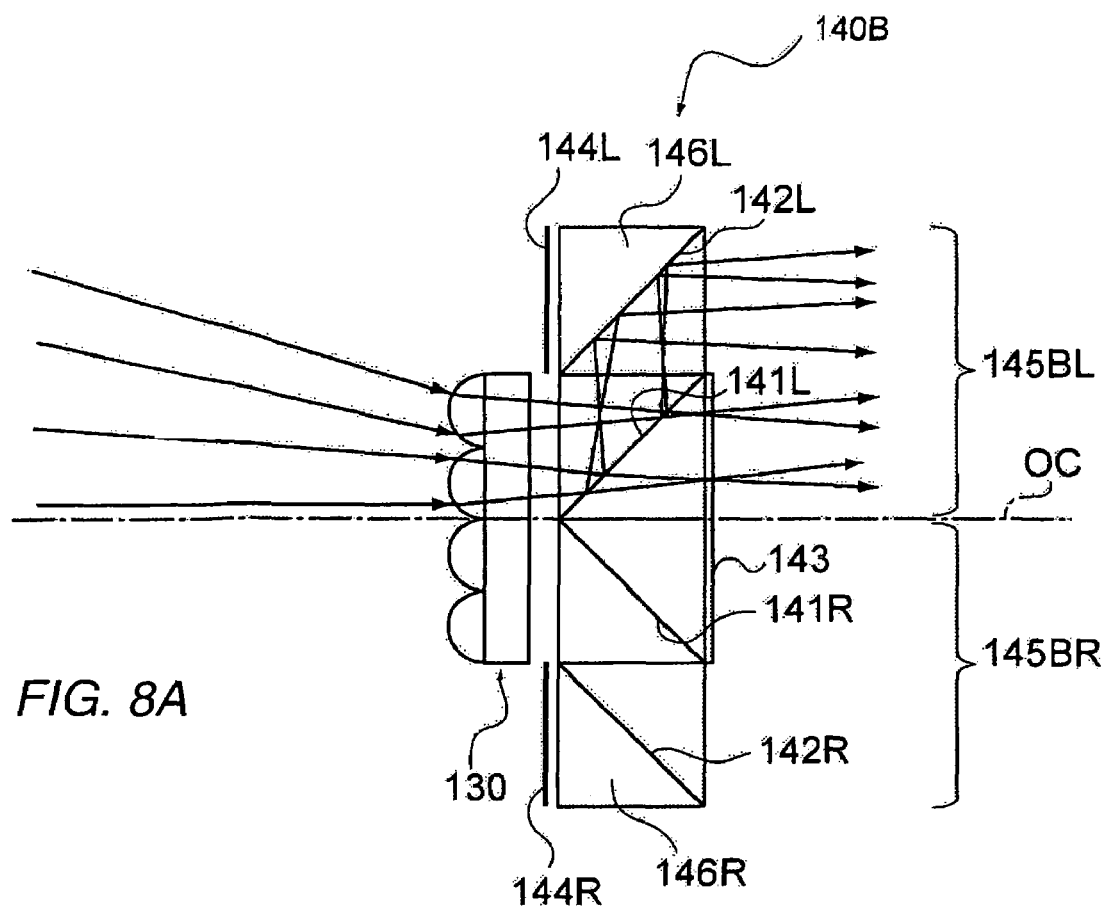
FIGS. 8A–B are schematics showing a modification example of the polarized light conversion element of Exemplary Embodiment 1.
Figure 8B:
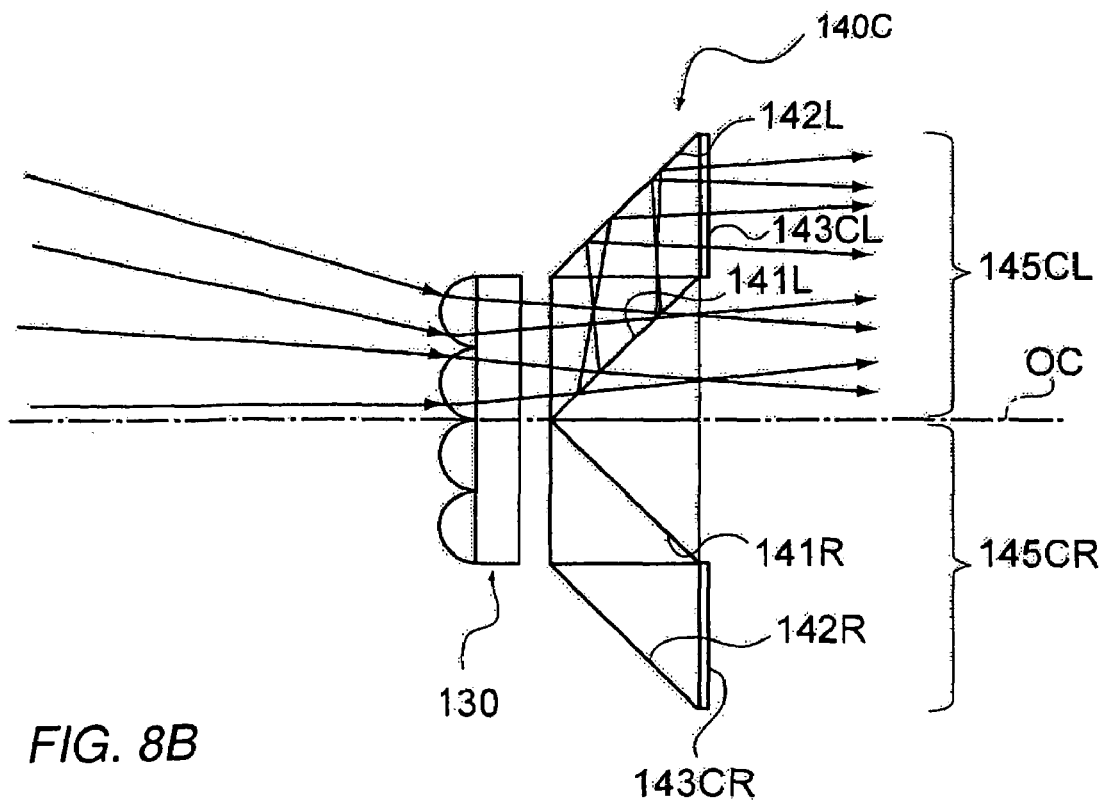

The below described polarized light conversion element also can be used in the illumination device 100 of Exemplary Embodiment 1. FIGS. 8(A)–(B) illustrate the modification examples of the polarized light conversion element of Exemplary Embodiment 1. FIG. 8(A) illustrates a modification example 1 thereof, and FIG. 8(B) illustrates a modification example 2 thereof.

The polarized light conversion element 140B of the modification example 1, as shown in FIG. 8(A), includes the portions 146L, 146R that were removed in the polarized light conversion element 140 of Exemplary Embodiment 1 and is composed of a polarized light conversion element with an almost rectangular cross-sectional shape. As a result, the operation of mounting the polarized light conversion element on the casing for mounting the optical elements is facilitated.

The difference between the polarized light conversion element 140C of the modification example 2 and the polarized light conversion element 140 in Exemplary Embodiment 1 is in the presence of the light-shielding plate and the location of the phase difference plate.

Thus, in the polarized light conversion element 140 of Exemplary Embodiment 1, light-shielding plates 144L, 144R shown in FIG. 7 were formed in the vicinity of the light incidence plate thereof, whereas in the polarized light conversion element 140C of modification example 2, as shown in FIG. 8(B), such light-shielding plates are not formed. However, even when the light-shielding plates are thus not formed, the undesirable light that falls on the polarized light conversion element 140C can be reflected to the outside of the system by the reflecting surfaces 142L, 142R. Therefore, the deterioration of optical performance of the polarized light conversion element caused by the incidence of the undesirable light can be reduced or prevented.

Further, in the polarized light conversion element 140 of Exemplary Embodiment 1, as described hereinabove, the phase difference plate 143 was disposed in the transmission region of partial luminous fluxes having the polarization axes in the aforementioned one direction (see FIG. 7), whereas in the polarized light conversion element 140C of the modification example 2, as shown in FIG. 8(B), the phase difference plates 143CL, 143CR are disposed in transmission regions of the partial luminous fluxes that have polarization axes in other directions. As a result, partial luminous fluxes outgoing from the polarized light conversion element 140C can be transformed into partial luminous fluxes having polarization axes in the aforementioned one direction. As a result, similarly to Exemplary Embodiment 1, it can be advantageously used in a projector using a liquid-crystal unit employing the polarized light.

As described hereinabove, the polarized light conversion elements 140B, 140C of the modification examples 1 and 2 apparently differ from the polarized light conversion element 140 of Exemplary Embodiment 1 in the presence of light-shielding plates and disposition location of the phase difference plate. However, similar to Exemplary Embodiment 1, they are the polarized light conversion elements including the first polarized light separation units 145BL, 145CL and second polarized light separation units 145BR, 145CR and the phase difference plate 143 (phase difference plates 143CL, 143CR in case of modification example 2). Therefore, the illumination device equipped with those polarized light conversion element 140B, 140C, similarly to the illumination device 100 of Exemplary Embodiment 1, makes it possible to reduce the production cost, to increase the light utilization efficiency and to extend the service life.

Exemplary Embodiment 2

Figure 9A:
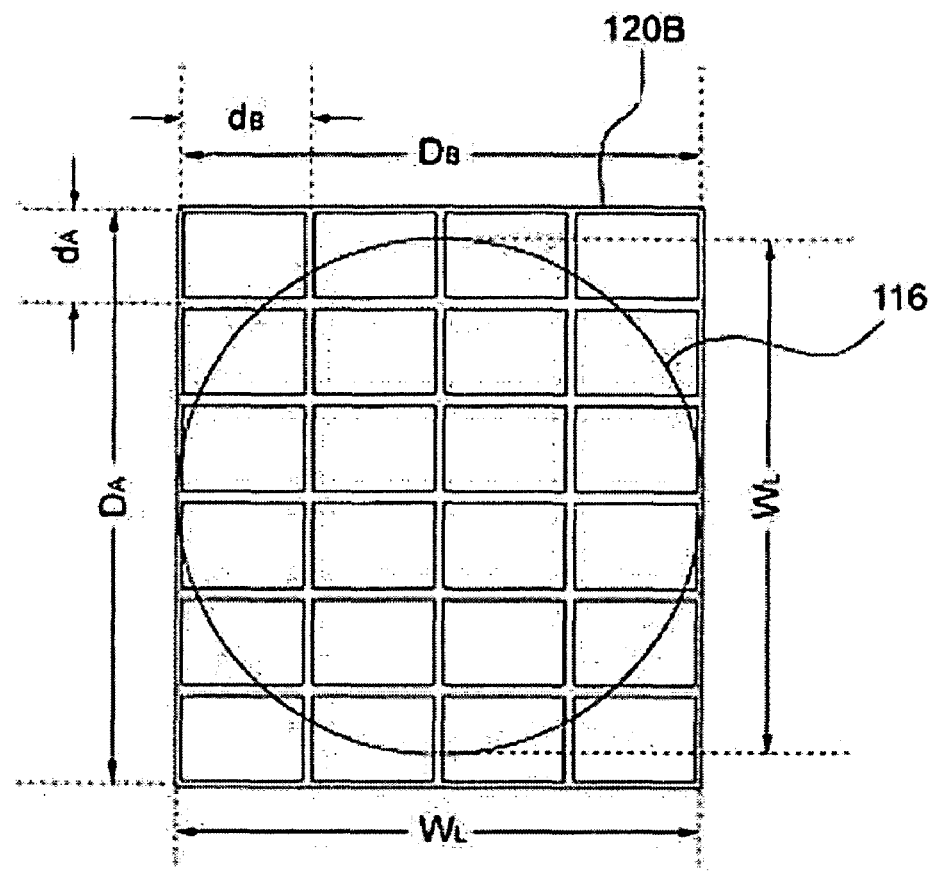
FIGS. 9A–B are schematics showing the first lens array of Exemplary Embodiment 2.
Figure 9B:
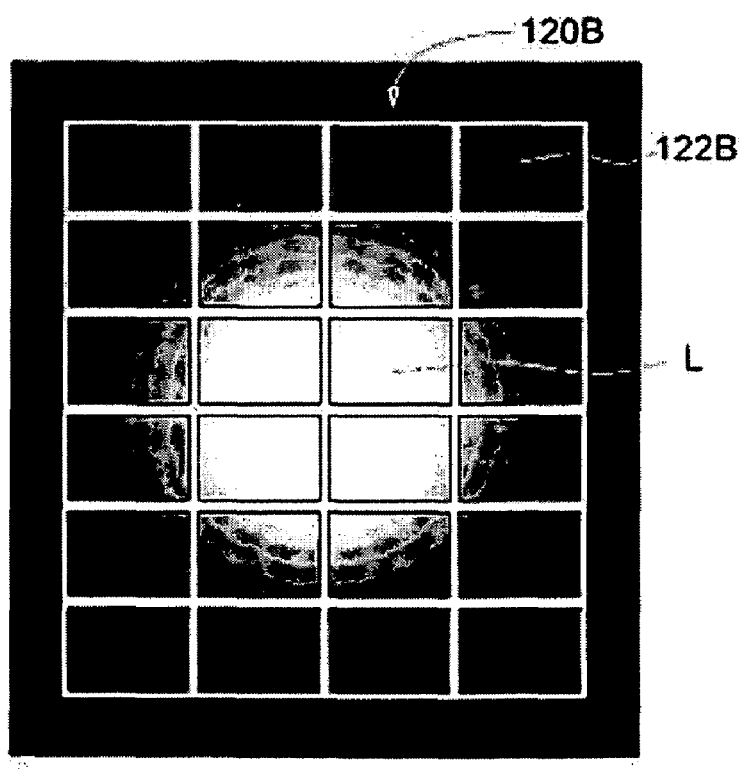

FIG. 9 illustrates the first lens array in Exemplary Embodiment 2. FIG. 9(A) is a front view of the first lens array along the optical axis of the system. FIG. 9(B) shows a light intensity distribution in the light incidence plane of the first lens array.

In the illumination device (not shown in the figure) of Exemplary Embodiment 2, the relationship between the effective diameter of the parallelizing lens and the maximum longitudinal size or maximum lateral size of the first lens array is different from that of the illumination device 100 of Exemplary Embodiment 1. Thus, in the illumination device 100 of Exemplary Embodiment 1, the effective diameter $W_L$ of the parallelizing lens 116, as shown in FIG. 3(A), was set to a size almost equal to the maximum longitudinal size $D_A$ of the first lens array 120, whereas in the illumination device of Exemplary Embodiment 2, the effective diameter $W_L$ of the parallelizing lens 116 is set to a size almost equal to the maximum lateral size $D_B$ of the first lens array 120B, as shown in FIG. 9(A).

Thus, in the illumination device of Exemplary Embodiment 2, the relationship between the effective diameter of the parallelizing lens and the maximum longitudinal size or maximum lateral size of the first lens array is different from that of the illumination device 100 of Exemplary Embodiment 1, but in other aspects, the illumination device of Exemplary Embodiment 2 has the configuration similar or identical to that of the illumination device 100 of Exemplary Embodiment 1. Therefore, it demonstrates the effect corresponding to that of the illumination device 100 of Exemplary Embodiment 1.

Further in the illumination device of Exemplary Embodiment 2, the effective diameter $W_L$ of the parallelizing lens 116 is set to a size almost equal to the maximum lateral size $D_B$ of the first lens array 120B. As a result, as shown in FIG. 9(b), almost the entire quantity of light of the luminous flux emitted from the parallelizing lens 116 can fall only on the light incidence plate of the first lens array 120B. Therefore, the light utilization efficiency of the first lens array 120B can be increased.

Exemplary Embodiment 3

Figure 10A:
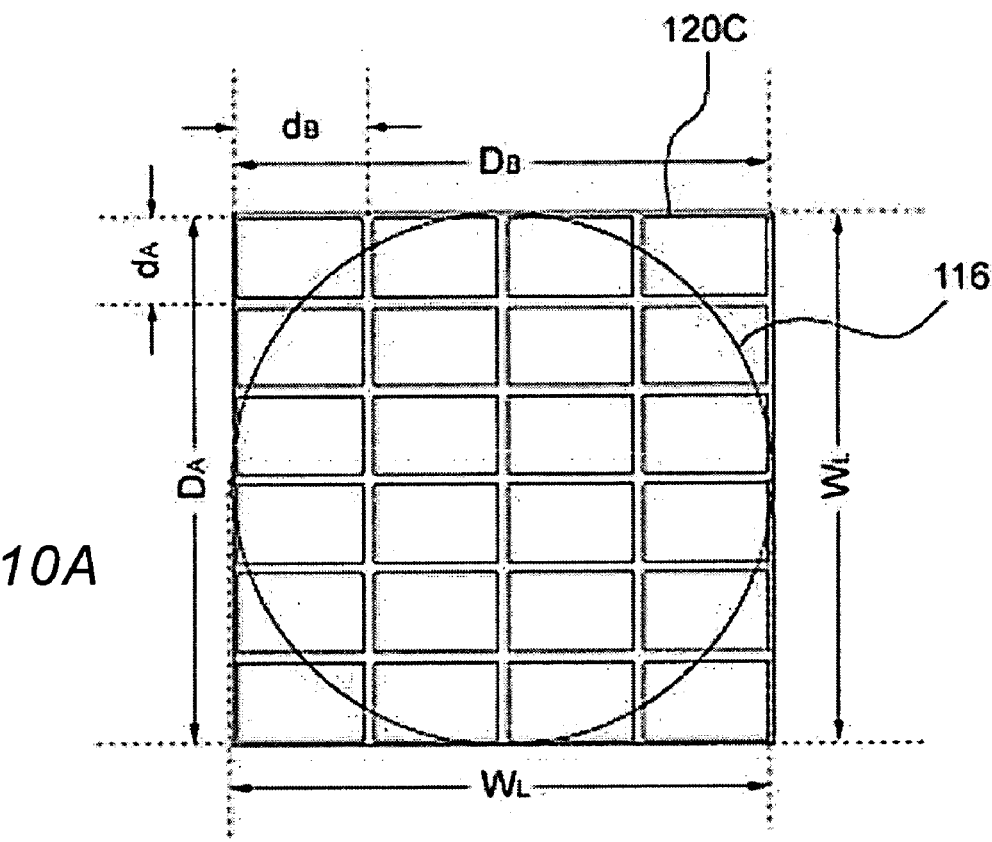
FIGS. 10A–B are schematics showing the first lens array of Exemplary Embodiment 3.
Figure 10B:
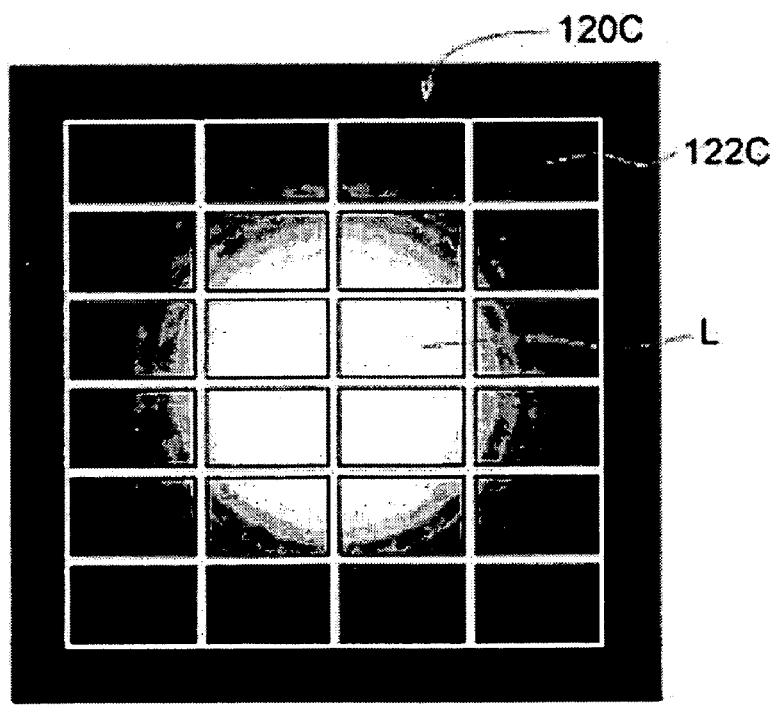

FIG. 10 illustrates the first lens array in Exemplary Embodiment 3. FIG. 10(a) is a front view of the first lens array along the optical axis of the system. FIG. 10(b) shows a light intensity distribution in the light incidence plane of the first lens array.

In the illumination device (not shown in the figure) of Exemplary Embodiment 3, the longitudinal/lateral size ratio of small lenses of the first lens array and the relationship between the effective diameter of the parallelizing lens and the maximum longitudinal size or maximum lateral size of the first lens array are different from those of the illumination device 100 of Exemplary Embodiment 1. Thus, in the illumination device 100 of Exemplary Embodiment 1, the longitudinal/lateral size ratio of small lenses 122 in first lens array 120 is set to a ratio of longitudinal size ($d_A$):lateral size ($d_B$)=3:4. In the illumination device of Exemplary Embodiment 3, the longitudinal/lateral size ratio of small lenses 122C in first lens array 120C is set to a ratio of longitudinal size ($d_A$):lateral size ($d_B$)=2:3. Further, in the illumination device 100 of Exemplary Embodiment 1, the effective diameter $W_L$ of the parallelizing lens 116, as shown in FIG. 3(a), was set to a size almost equal to the maximum longitudinal size $D_A$ of the first lens array 120. In the illumination device of Exemplary Embodiment 3, the effective diameter $W_L$ of the parallelizing lens 116 is set to a size almost equal to the maximum longitudinal size $D_A$ and maximum lateral size $D_B$ of the first lens array 120C, as shown in FIG. 10(a).

Thus, in the illumination device of Exemplary Embodiment 3, the longitudinal/lateral size ratio of small lenses of the first lens array and the relationship between the effective diameter of the parallelizing lens and the maximum longitudinal size or maximum lateral size of the first lens array is different from that of the illumination device 100 of Exemplary Embodiment 1, but in other aspects, the illumination device of Exemplary Embodiment 3 has the configuration similar to or identical to that of the illumination device 100 of Exemplary Embodiment 1. Therefore, it demonstrates the effect corresponding to that of the illumination device 100 of Exemplary Embodiment 1.

Further, in the illumination device of Exemplary Embodiment 3, as described hereinabove, the longitudinal-lateral size ratio of the small lenses 122C in the first lens array 120C is set to a longitudinal size ($d_A$):lateral size ($d_B$)=2:3 and the effective diameter $W_L$ of the parallelizing lens 116 is set to be almost equal to the maximum longitudinal size $D_A$ and maximum lateral size $D_B$ of the first lens array 120C.

As a result, a square shape of the first lens array 120C can be obtained. Furthermore, because the effective diameter $W_L$ of the parallelizing lens 116 is set to be almost equal to the maximum longitudinal size $D_A$ and maximum lateral size $D_B$ of the first lens array 120C, as shown in FIG. 10, the illumination luminous flux from the parallelizing lens 116 can be in the form of an inscribed circle of the first lens array 120C. As a result, the degradation of the in-plane light intensity distribution characteristic in the light incidence plate of the first lens array 120C can be inhibited and the light utilization efficiency in the first lens array 120C can be increased.

Further, it is preferred that the illumination device of Exemplary Embodiment 3 be provided with an optical element, such as a cylindrical lens, to correct the longitudinal-lateral size ratio of the illumination luminous flux from the first lens array 120C in order to obtain the longitudinal-lateral size ratio of the cross section of the illumination luminous flux in the illuminated region of lateral size ($d_A$):lateral size ($d_B$)=3:4. As a result, due to action of such an optical element, the longitudinal-lateral size ratio of the illumination luminous flux outgoing from the first lens array 120C can be corrected to a longitudinal size:lateral size ratio of=3:4 on the image formation region of the liquid-crystal unit in the illuminated region. Therefore, the light utilization efficiency in the projector can be increased and a stray light level can be reduced.

Exemplary Embodiment 4

Figure 11A:
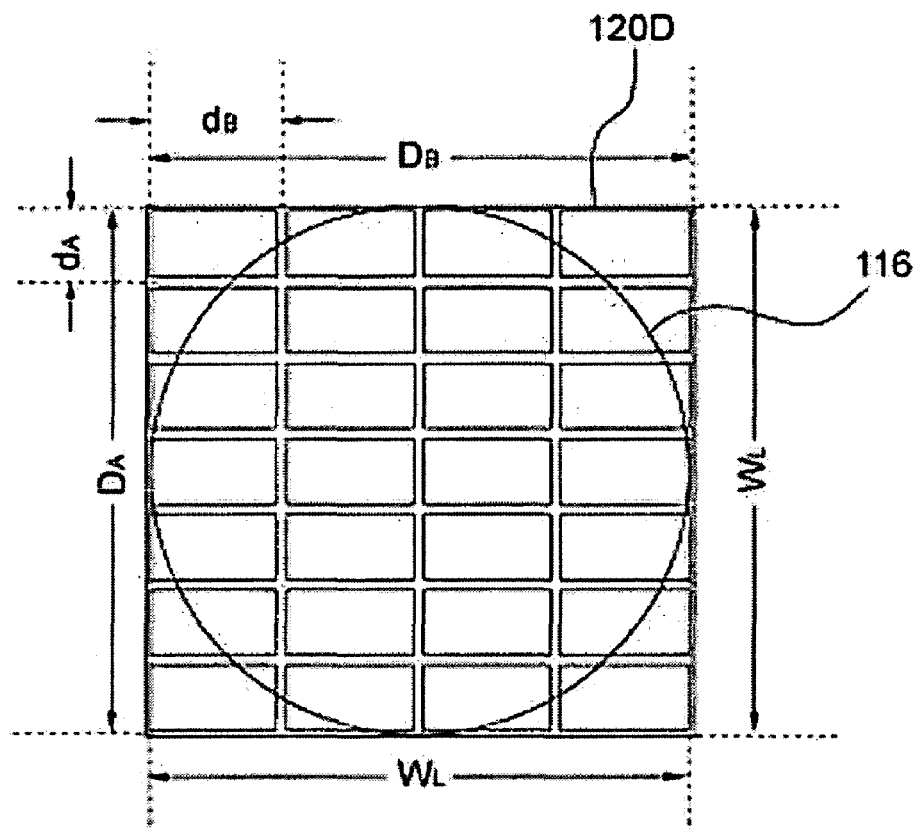
FIGS. 11A–B are schematics showing the first lens array of Exemplary Embodiment 4.
Figure 11B:
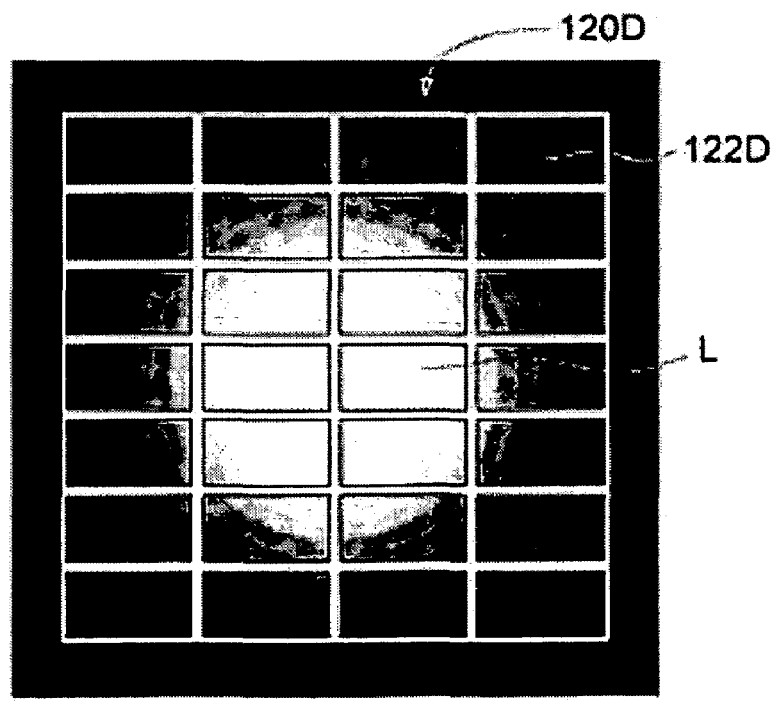

FIG. 11 illustrates the first lens array in Exemplary Embodiment 4. FIG. 11(A) is a front view of the first lens array along the optical axis of the system. FIG. 11(B) shows the light intensity distribution in the light incidence plane of the first lens array.

The configuration of the liquid-crystal unit in the projector (not shown in the figures) of Exemplary Embodiment 4 is different from that of the projector 1 of Exemplary Embodiment 1. Thus, the projector 1 of Exemplary Embodiment 1 used the liquid-crystal units 400R, 400G, 400B in which the longitudinal-lateral size ratio in the image formation region was set to longitudinal size:lateral size=3:4. The projector in Exemplary Embodiment 4 uses liquid-crystal units (not shown in the figures) for wide vision in which the longitudinal-lateral size ratio in the image formation region was set to longitudinal size:lateral size=9:16.

Further, in the illumination device (not shown in the figures) of Exemplary Embodiment 4, because of the above-described difference in the configuration liquid-crystal units, the configurations of the first lens array and second lens array are also different from those of the illumination device 100 of Exemplary Embodiment 1. Thus, the illumination device of Exemplary Embodiment 4 includes an optical source unit 110, a first lens array 120D (see FIG. 11(a)) in which small lenses 122D in the form of plane rectangles to split the illumination luminous flux emitted from the light source unit 110 into a plurality of partial luminous fluxes are arranged as a matrix with 7 rows and 4 columns in the longitudinal and lateral directions, respectively, a second lens array (not shown in the figures) having a lateral width less than the lateral width of the first lens array 120D and serving to make each partial luminous flux, which was split by the first lens array 120D, parallel to the optical axis of the system, and a polarized light conversion element 140 to convert each partial luminous flux outgoing from the second lens array into a partial luminous flux having a polarization axis in the prescribed direction.

Therefore, because the illumination device of Exemplary Embodiment 4 includes the aforementioned polarized light conversion element 140, the production cost can be reduced, light utilization efficiency can be increased, and service life can be extended, similarly to the illumination device 100 of Exemplary Embodiment 1.

In the illumination device of Exemplary Embodiment 4, small lenses 122D of the first lens array 120D, as shown in FIG. 11(a), are arranged in the form of a matrix with seven rows and four columns in the longitudinal and lateral directions, respectively, in a plane perpendicular to the optical axis OC of the system and disposed in positions corresponding to each row and column of this matrix. As a result, the number of small lenses 122D of the first lens array 120D can be 28 and the number of lenses can be reduced. Therefore, the process for the manufacture of the first lens array can be simplified and cost thereof can be reduced.

In the illumination device of Exemplary Embodiment 4, the longitudinal-lateral size ratio of small lenses 122D in the first lens array 120D is set to longitudinal size ($d_A$):lateral size ($d_B$)=9:16. As a result, when liquid-crystal units for wide vision in which the longitudinal-lateral size ratio in the image formation region was set to longitudinal size:lateral size=9:16 are used, the light utilization ratio in the projector can be increased and the level of stray light can be reduced.

In the illumination device of Exemplary Embodiment 4, a configuration may be used in which the small lenses 122D of the first lens array 120D are disposed in matrix position, except the positions corresponding to the first row—first column, first row—fourth column, seventh row—first column, and seventh row—fourth column of the matrix consisting of 7 rows and 4 columns. As a result, the number of small lenses 122D of the first lens array 120D can be further reduced by four.

Exemplary Embodiment 5

Figure 12:
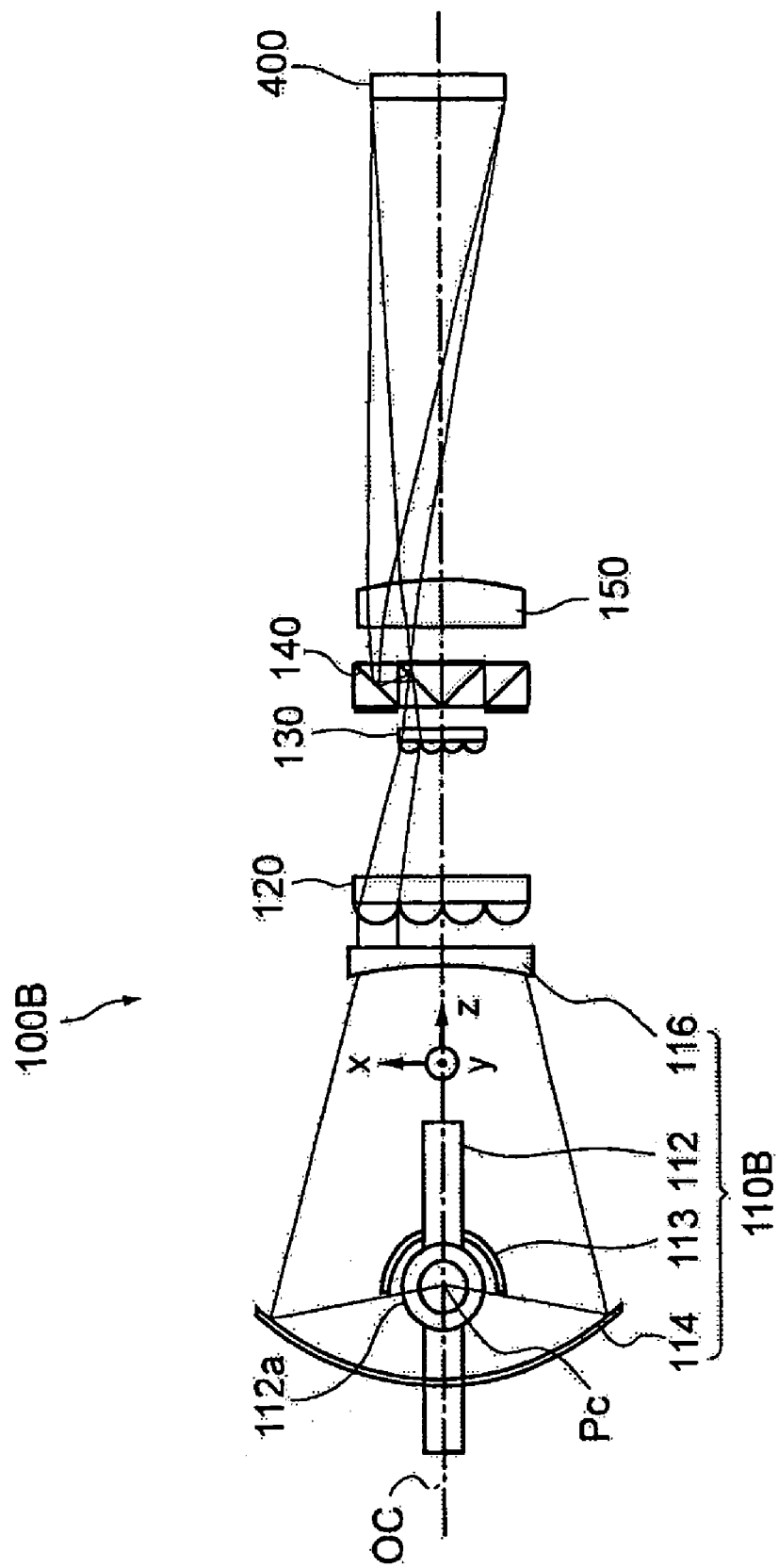
FIG. 12 is a schematic showing the illumination device of Exemplary Embodiment 5.
Figure 13:
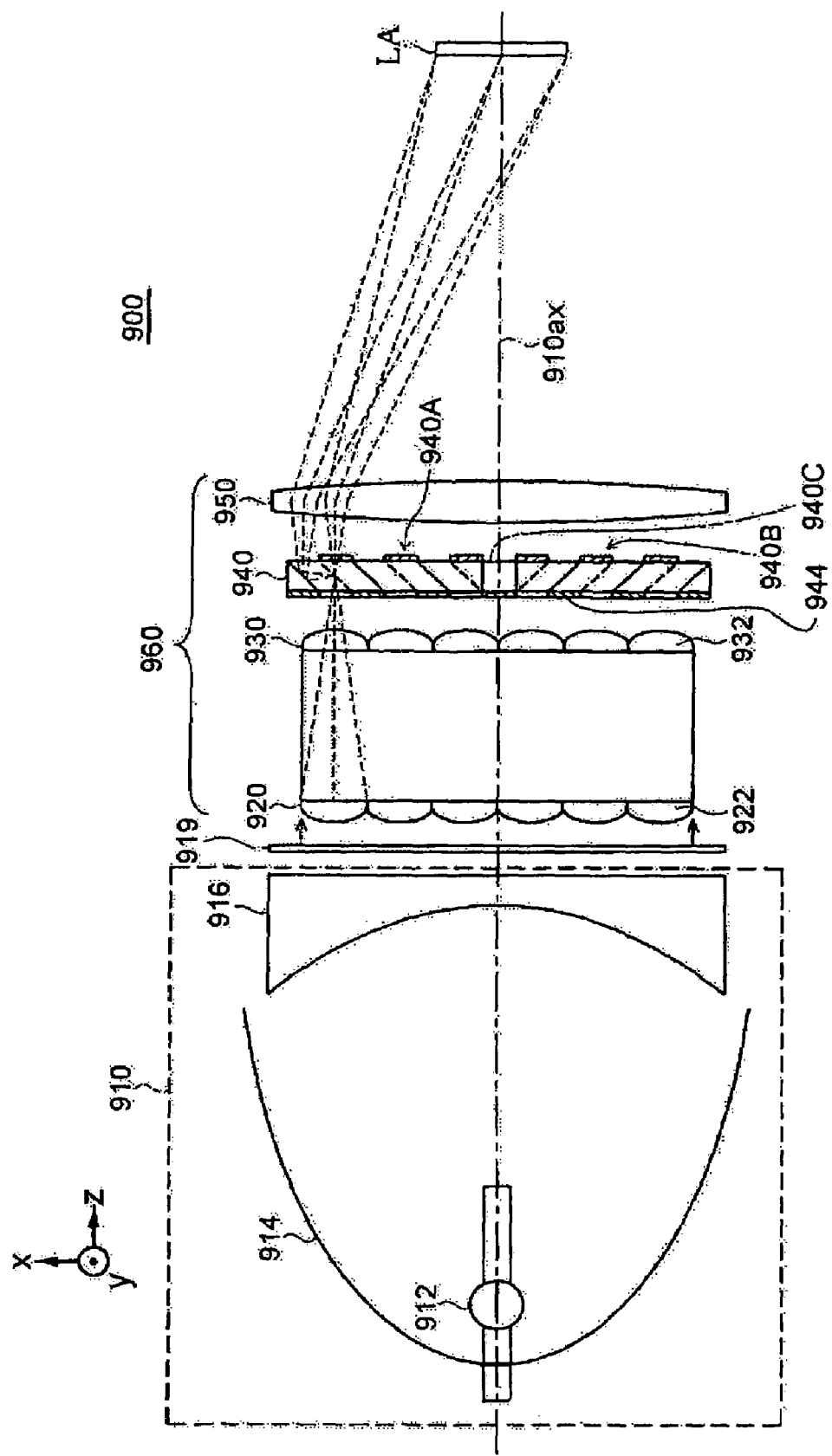
FIG. 13 is schematic showing the related art illumination device.
Figure 14A:
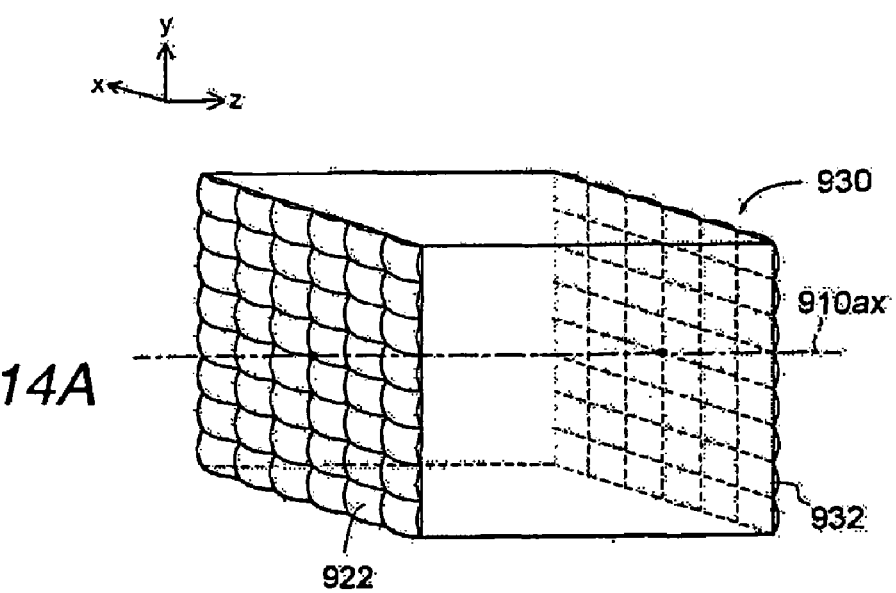
FIGS. 14A–C are schematics showing the integrator optical system in the related art illumination device.
Figure 14B:
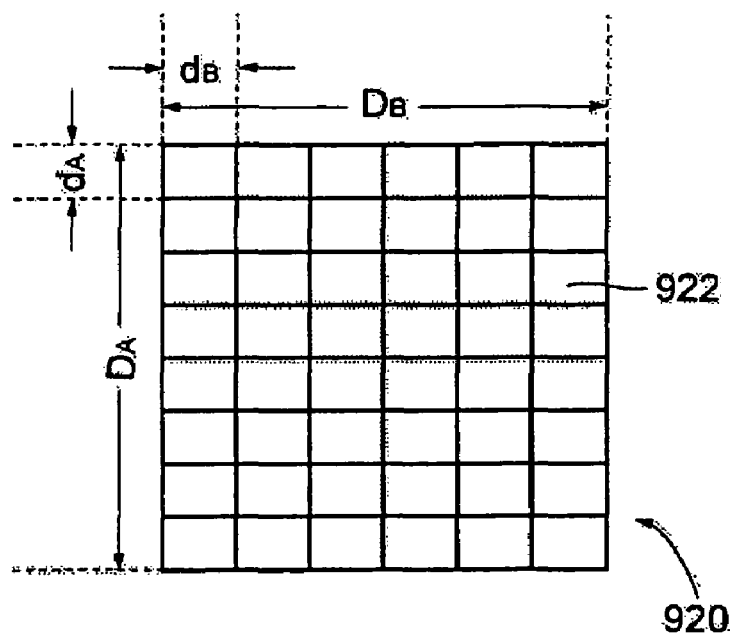
Figure 14C:
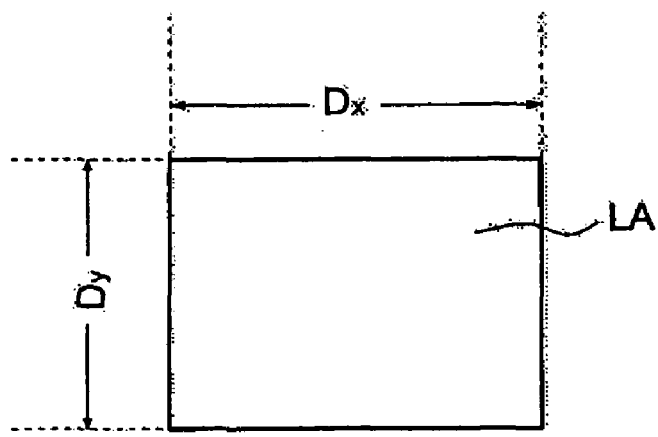

FIG. 12 illustrates the illumination device of Exemplary Embodiment 5. In FIG. 12, the components identical to those shown in FIG. 2 are denoted by the same reference symbols and the explanation thereof is omitted.

The configuration of the light source unit in the illumination device 100B of Exemplary Embodiment 5 is different from that of the illumination device 100 of Exemplary Embodiment 1. Thus, in the illumination device 100B of Exemplary Embodiment 5, the light source unit 110B, as shown in FIG. 12, additionally includes an auxiliary mirror 113 as a reflecting device to reflect the light, which is emitted from the light-emitting tube 112 onto the illuminated region, toward an elliptical reflector 114.

The auxiliary mirror 113 is composed of a reflective concave body and disposed on the illuminated region side of the light-emitting tube 112a. More specifically, the auxiliary mirror is disposed in a position facing, via a gap for alignment, almost half of the tube surface positioned on the +z direction side (propagation direction side of the light emitted from the light source unit 110B) from "the plane containing the center Pc of the light-emitting portion 112a and parallel to the xy plane". The auxiliary mirror 113 can be formed, for example, by depositing a dielectric multilayer film of $Ta_2O_5$ and $SiO_2$ on the concave surface of the concave body.

Thus, the illumination device 100B of Exemplary Embodiment 5 differs from the illumination device 100 of Exemplary Embodiment 1 in the configuration of the light source unit, but in other aspects has the configuration similar or identical to that of the illumination device 100 of Exemplary Embodiment 1. Therefore it demonstrates the effect similar or identical to that of the illumination device 100 of Exemplary Embodiment 1.

Further, in the illumination device 100B of Exemplary Embodiment 5, the light-emitting tube 112 is provided with the auxiliary mirror 113 to reflect the light emitted from the light-emitting tube 112 onto the illuminated region toward the elliptical reflector 114. As a result, the light emitted from the light-emitting tube 112 onto the illuminated region is reflected toward the elliptical reflector 114. Therefore, it is not necessary to set the size of the elliptical reflector so as to cover the end portions of the light-emitting tube 112 on the side of the illuminated region and the elliptical reflector can be miniaturized and consequently the illumination device can be miniaturized.

Further, miniaturizing the elliptical reflector makes it possible to decrease the beam spot and convergence angle of the beam converged from the elliptical reflector 114 toward the second focal point $F_2$ of the elliptical reflector 114. Therefore, optical elements of the last stage, starting from the parallelizing lens 116, can be reduced in size and the illumination device can be further miniaturized.

In the illumination device 100B of Exemplary Embodiment 5, a reflecting film directly formed by deposition on the tubular surface of the light-emitting tube 112 may be used instead of the auxiliary mirror 113 as a reflecting device.

The invention claimed is:

1. An illumination device, comprising:
   a light-emitting tube including a light-emitting portion to emit an illumination light;
   an elliptical reflector having respective focal points in a vicinity of a location of the light-emitting portion of the light-emitting tube and further in an illuminated region from the location of the light-emitting portion;
   a parallelizing lens to make parallel the illumination luminous flux outgoing from the elliptical reflector;
   a first lens array in which small lenses having a flat rectangular shape, which split the illumination luminous flux parallelized with the parallelizing lens into a plurality of partial luminous fluxes, are arranged as a matrix composed of 6 rows and 4 columns in a longitudinal direction and lateral direction, respectively;
   a second lens array having a lateral width less than a lateral width of the first lens array and setting each partial luminous flux, split by the first lens array, parallel to an optical axis of the device; and
   a polarized light conversion element to convert each partial luminous flux outgoing from the second lens array into a partial luminous flux having a polarization axis in a prescribed direction,
   the polarized light conversion element includes:
   a first polarized light separation unit composed of a single polarized light separation surface to transmit the partial luminous fluxes having polarization axes in one direction and to reflect the partial luminous fluxes having polarization axes in other directions with respect to partial luminous fluxes of two rows, a first row and second row, of the second lens array and a single reflecting surface to further reflect the partial luminous fluxes having polarization axes in other directions that were reflected by the polarized light separation surface and to arrange them in a direction parallel to the partial luminous fluxes having polarization axes in the aforementioned one direction;
   a second polarized light separation unit which has a configuration with a left-right symmetry with respect to the first polarized light separation unit and is composed of a single polarized light separation surface to transmit the partial luminous fluxes having polarization axes in one direction and to reflect the partial luminous fluxes having polarization axes in other directions with respect to partial luminous fluxes of two rows, a third row and a fourth row, of the second lens array and a single reflecting surface to further reflect the partial luminous fluxes having polarization axes in other directions that were reflected by the polarized light separation surface and to arrange them in a direction parallel to the partial luminous fluxes having polarization axes in the aforementioned one direction; and
   a phase difference plate disposed in either a transmission region of the partial luminous fluxes having polarization axes in the one direction or a transmission region of the partial luminous fluxes having polarization axes in the other direction.

2. The illumination device according to claim 1, small lenses of the first lens array being disposed in matrix positions, except those corresponding to the first row—first column, first row—fourth column, sixth row—first column, and sixth row—fourth column of the matrix.

3. The illumination device according to claim 1,
the longitudinal-lateral size ratio of the small lenses in the first lens array being set to a ratio of longitudinal size:lateral size=3:4.

4. The illumination device according to claim 1,
the phase difference plate being a single phase difference plate disposed in a continuous fashion in the transmission region of the partial luminous flux having a polarization axis in the one direction.

5. The illumination device according to claim 1,
the polarized light conversion element being composed of a polarized light conversion element with a trapezoidal lateral cross section, and the reflecting surfaces being disposed in positions corresponding to both sides of a trapezoid of the polarized light conversion element.

6. The illumination device according to claim 1,
a maximum lateral size of the second lens array being set to a size which is about half a maximum lateral size of said first lens array.

7. The illumination device according to claim 1,
the lateral size of the light incidence surface of the polarized light conversion element being set to a size almost equal to a maximum lateral size of the second lens array.

8. The illumination device according to claim 1,
the light-emitting tube being provided with a reflecting device to reflect the light emitted from the light-emitting tube to the illuminated region toward the elliptical reflector.

9. A projector, comprising:
the illumination device described in claim 1;
an electrooptical modulation device to modulate the illumination light from the illumination device according to the image, information; and
a projecting optical system to project the modulated light from said electrooptical modulation device.

10. The projector according to claim 9,
small lenses of the first lens array being disposed in matrix positions, except those corresponding to the first row—first column, first row—fourth column, sixth row—first column, and sixth row—fourth column of the matrix.

11. The projector according to claim 9,
the longitudinal-lateral size ratio of the small lenses in the first lens array being set to a ratio of longitudinal size:lateral size=3:4.

12. The projector according to claim 9,
the phase difference plate being a single phase difference plate disposed in a continuous fashion in the transmission region of the partial luminous flux having a polarization axis in the one direction.

13. The projector according to claim 9,
the polarized light conversion element being composed of a polarized light conversion element with a trapezoidal lateral cross section, and the reflecting surfaces being disposed in positions corresponding to both sides of the trapezoid of the polarized light conversion element.

14. The projector according to claim 9,
a maximum lateral size of the second lens array being set to a size which is about half a maximum lateral size of the first lens array.

15. The projector according to claim 9,
the lateral size of the light incidence surface of the polarized light conversion element being set to a size almost equal to a maximum lateral size of the second lens array.

16. The projector according to claim 9,
the light-emitting tube being provided with a reflecting device to reflect the light emitted from the light-emitting tube to the illuminated region toward the elliptical reflector.

17. An illumination device, comprising:
a light-emitting tube including a light-emitting portion to emit an illumination light;
an elliptical reflector having respective focal points in a vicinity of a location of the light-emitting portion of the light-emitting tube and further in an illuminated region from a location of the light-emitting portion;
a parallelizing lens to make parallel the illumination luminous flux outgoing from the elliptical reflector;
a first lens array in which small lenses having a flat rectangular shape, which split the illumination luminous flux parallelized with the parallelizing lens into a plurality of partial luminous fluxes, are arranged as a matrix composed of 7 rows and 4 columns in a longitudinal direction and lateral direction, respectively;
a second lens array having a lateral width less than a lateral width of the first lens array and setting each partial luminous flux, split by the first lens array, parallel to an optical axis of the device; and
a polarized light conversion element to convert each partial luminous flux outgoing from the second lens array into a partial luminous flux having a polarization axis in a prescribed direction,
the polarized light conversion element includes:
a first polarized light separation unit composed of a single polarized light separation surface to transmit the partial luminous fluxes having polarization axes in one direction and to reflect the partial luminous fluxes having polarization axes in other directions with respect to partial luminous fluxes of two rows, a first row and second row, of the second lens array and a single reflecting surface to further reflect the partial luminous fluxes having polarization axes in other directions that were reflected by the polarized light separation surface and to arrange them in a direction parallel to the partial luminous fluxes having polarization axes in the aforementioned one direction;
a second polarized light separation unit which has a configuration with a left-right symmetry with respect to the first polarized light separation unit and is composed of a single polarized light separation surface to transmit the partial luminous fluxes having polarization axes in one direction and to reflect the partial luminous fluxes having polarization axes in other directions with respect to partial luminous fluxes of two rows, a third row and a fourth row, of the second lens array and a single reflecting surface to further reflect the partial luminous fluxes having polarization axes in other directions that were reflected by the polarized light separation surface and to arrange them in a direction parallel to the partial luminous fluxes having polarization axes in the aforementioned one direction; and
a phase difference plate disposed in either a transmission region of the partial luminous fluxes having polarization axes in the one direction or a transmission region of the partial luminous fluxes having polarization axes in the other direction.

18. The illumination device according to claim 17,
small lenses of the first lens array being disposed in matrix positions, except those corresponding to the first row— first column, first row—fourth column, seventh row—first column, and seventh row—fourth column of the matrix.

19. The illumination device according to claim 17,
the longitudinal-lateral size ratio of the small lenses in the first lens array is set to a ratio of longitudinal size:lateral size=9:16.

20. A projector, comprising:
the illumination device described in claim 17;
an electrooptical modulation device to modulate the illumination light from the illumination device according to the image information; and
a projecting optical system to project the modulated light from the electrooptical modulation device.

21. The projector according to claim 20,
small lenses of the first lens array being disposed in matrix positions, except those corresponding to the first row—first column, first row—fourth column, seventh row—first column, and seventh row—fourth column of the matrix.

22. The projector according to claim 20,
the longitudinal-lateral size ratio of the small lenses in the first lens array being set to a ratio of longitudinal size:lateral size=9:16.

* * * * *